US012123422B2

(12) United States Patent
Lapointe

(10) Patent No.: US 12,123,422 B2
(45) Date of Patent: Oct. 22, 2024

(54) FAN DEVICE FOR ENGINE LOADING

(71) Applicant: Larry P. Lapointe, Temperance, MI (US)

(72) Inventor: Larry P. Lapointe, Temperance, MI (US)

( * ) Notice: Subject to any disclaimer, the term of this patent is extended or adjusted under 35 U.S.C. 154(b) by 182 days.

(21) Appl. No.: 17/856,053

(22) Filed: Jul. 1, 2022

(65) Prior Publication Data

US 2023/0011552 A1 Jan. 12, 2023

Related U.S. Application Data

(60) Provisional application No. 63/218,769, filed on Jul. 6, 2021.

(51) Int. Cl.
*F04D 25/02* (2006.01)
*F04D 17/02* (2006.01)

(52) U.S. Cl.
CPC ............ *F04D 25/02* (2013.01); *F04D 17/02* (2013.01)

(58) Field of Classification Search
CPC ........ F04D 25/02; F04D 17/02; F04D 19/002; F04D 25/022; F04D 25/08; F16H 7/06; F16H 7/08; F04B 17/06
USPC ................. 474/133, 135; 74/11; 417/34, 362
See application file for complete search history.

(56) References Cited

U.S. PATENT DOCUMENTS

| 2,513,480 A | * | 7/1950 | Heth | F26B 19/005 |
| | | | | 56/364 |
| 2,587,240 A | * | 2/1952 | Spreng | A01M 7/0014 |
| | | | | 415/125 |
| 2,783,655 A | * | 3/1957 | Meckoski | F16H 9/06 |
| | | | | 474/89 |
| 3,409,221 A | * | 11/1968 | Patterson | A01M 7/0014 |
| | | | | 47/2 |
| 3,727,847 A | * | 4/1973 | Nelson | B02C 25/00 |
| | | | | 241/101.76 |
| 3,915,024 A | * | 10/1975 | Mort | F01P 5/04 |
| | | | | 123/195 A |

(Continued)

FOREIGN PATENT DOCUMENTS

WO WO-2006061070 A1 * 6/2006 ........... F16H 7/1209

OTHER PUBLICATIONS

WO 2006061070 A1 Hartman (Year: 2006).*

(Continued)

*Primary Examiner* — Michael R Mansen
*Assistant Examiner* — Mark K Buse
(74) *Attorney, Agent, or Firm* — Harness, Dickey & Pierce, P.L.C.

(57) ABSTRACT

A fan apparatus may include a frame, a fan, and a drive mechanism. The fan may be supported for rotation relative to the frame and may include a fan shaft and a plurality of blades extending outward from the fan shaft. The drive mechanism may include a driven wheel, a drive shaft, a first drive wheel, a second drive wheel, and a torque-transmission loop. The driven wheel may be mounted on the fan shaft. The drive shaft may be supported for rotation relative to the frame. The first drive wheel may be mounted on the drive shaft. The second drive wheel may be mounted on the drive shaft. The torque-transmission loop may be engaged with the driven wheel and a selected one of the first and second drive wheels.

9 Claims, 22 Drawing Sheets

(56) References Cited

U.S. PATENT DOCUMENTS

| | | | | |
|---|---|---|---|---|
| 4,352,635 A * | 10/1982 | Saunders | ................ | F01P 7/048 |
| | | | | 417/16 |
| 4,417,636 A * | 11/1983 | Mazur | ...................... | F01P 5/06 |
| | | | | 165/122 |
| 8,833,985 B2 * | 9/2014 | Robertson | ................. | F21K 9/20 |
| | | | | 362/486 |
| 2009/0036240 A1 * | 2/2009 | Sakanaka | ................ | F16G 5/166 |
| | | | | 474/8 |

OTHER PUBLICATIONS

Claude P. Abbert, The Baker Fan, Jan. 1, 1975.
Lyle Hoffmaster, The Baker Fan, Jan. 1, 1964.
Leroy W. Blaker, The Baker Fan, Mar. 1, 1958.

* cited by examiner

FAN DEVICE FOR ENGINE LOADING

CROSS-REFERENCE TO RELATED APPLICATIONS

This application claims the benefit of U.S. Provisional Application No. 63/218,769, filed on Jul. 6, 2021. The entire disclosure of the above application is incorporated herein by reference.

FIELD

The present disclosure relates to a fan device for providing a load on an engine.

BACKGROUND

This section provides background information related to the present disclosure and is not necessarily prior art.

A fan assembly may provide a load to an engine (e.g., an internal combustion engine or a steam traction engine, for example) of a farm tractor, for example. Applying a load to an engine may be beneficial for ongoing maintenance and upkeep of the engine. For example, load application may be beneficial for the breaking-in a new engine or a newly overhauled or rebuilt engine. Applying a load to the engine in a stationary position may allow easy and safe adjustments such as tuning or changes to the carburation or timing of the engine.

A fan assembly may be coupled to the engine by a belt pulley coupled to a shaft of the fan assembly. A belt may connect the pulley of the fan assembly to a belt pulley driven by the engine. Generally, the faster the fan rotates for a given fan blade size; the more horsepower is required to turn the fan. Because a drive ratio of the drive pulley of the engine to the driven pulley on the fan, smaller engines can be either unable to start the fan because of inadequate horsepower or are overloaded, which can cause damage to the engine.

A fan assembly mounted to a stationary frame is not easily movable from location to location. Furthermore, because the frame is not easily movable, when connecting a belt to the pulleys of the tractor engine and the fan assembly, it is necessary to move the tractor relative to the fan assembly to properly tension the belt. Once the belt is tensioned, it can be difficult to shift the tractor's transmission to a neutral position because of the tension applied from the belt to the tractor's drive train.

The present disclosure provides fan assemblies that can be easily adjusted to provide a proper amount of load for engines of various sizes. The present disclosure also provides fan assemblies mounted on a mobile frame that facilitates transportation and storage of the fan assembly and also facilitates connection of the fan assembly to an engine.

SUMMARY

This section provides a general summary of the disclosure, and is not a comprehensive disclosure of its full scope or all of its features.

In one form, the present disclosure provides a fan apparatus that may include a frame, a fan, and a drive mechanism. The fan may be supported for rotation relative to the frame and may include a fan shaft and a plurality of blades extending outward from the fan shaft. The drive mechanism may include a driven wheel, a drive shaft, a first drive wheel, a second drive wheel, and a first torque-transmission loop. The driven wheel may be mounted on the fan shaft. The drive shaft may be supported for rotation relative to the frame. The first drive wheel may be mounted on the drive shaft. The second drive wheel may be mounted on the drive shaft. The first torque-transmission loop may be engaged with the driven wheel and a selected one of the first and second drive wheels.

In some configurations of the fan apparatus of the above paragraph, the drive mechanism includes a tensioner assembly configured to engage the first torque-transmission loop.

In some configurations of the fan apparatus of the above paragraph, the tensioner assembly includes a loop-tightening lever mounted for rotation relative to the frame, a tightening wheel rotatably mounted to the loop-tightening lever, and an adjustment mechanism attached to the loop-tightening lever and movable to adjust a position of the loop-tightening lever relative to the frame.

In some configurations of the fan apparatus of the above paragraph, the adjustment mechanism includes a turnbuckle.

In some configurations of the fan apparatus of any of the above paragraphs, the drive mechanism includes a belt pulley drivingly coupled to the fan shaft.

In some configurations of the fan apparatus of any of the above paragraphs, the belt pulley is mounted on the fan shaft.

In some configurations of the fan apparatus of any of the above paragraphs, the drive mechanism includes a belt-pulley-shaft mounted for rotation relative to the frame. The belt-pulley-shaft may be connected to the fan shaft by a second torque-transmission loop.

In some configurations of the fan apparatus of any of the above paragraphs, the drive mechanism includes a first belt-pulley-wheel mounted on the belt-pulley-shaft, a second belt-pulley-wheel mounted on the belt-pulley-shaft, and a belt-pulley-driven-wheel mounted on the fan shaft. The second torque-transmission loop may be engaged with the belt-pulley-driven-wheel and a selected on of the first and second belt-pulley-wheels.

In some configurations, the fan apparatus of any of the above paragraphs includes a base supporting the frame, the fan, and the drive mechanism. The base may include a transport mechanism.

In some configurations of the fan apparatus of any of the above paragraphs, the transport mechanism includes a plurality of wheels that movably support the fan apparatus.

In some configurations of the fan apparatus of any of the above paragraphs, the base includes a jack stand.

In some configurations of the fan apparatus of any of the above paragraphs, the transport mechanism includes a plurality of skids that movably support the fan apparatus.

In another form, the present disclosure provides a fan apparatus that may include a fan assembly and a movable base. The fan assembly may include a frame, a fan shaft mounted for rotation relative to the frame, and a drive mechanism configured to drive the fan shaft. The movable base may include a base frame and a transport mechanism. The base frame may support the fan assembly. The transport mechanism may movably supporting the base frame.

In some configurations of the fan apparatus of the above paragraph, the transport mechanism includes a plurality of wheels that movably support the fan apparatus.

In some configurations of the fan apparatus of either of the above paragraphs, the movable base includes a jack stand.

In some configurations of the fan apparatus of any of the above paragraphs, the transport mechanism includes a plurality of skids that movably support the fan apparatus.

In some configurations of the fan apparatus of any of the above paragraphs, the drive mechanism includes a belt pulley drivingly coupled to the fan shaft.

In some configurations of the fan apparatus of any of the above paragraphs, the drive mechanism includes a driven wheel mounted on the fan shaft, a drive shaft supported for rotation relative to the frame, a first drive wheel mounted on the drive shaft, a second drive wheel mounting on the drive shaft, and a first torque-transmission loop mounted on the driven wheel and a selected one of the first and second drive wheels.

In some configurations of the fan apparatus of any of the above paragraphs, the drive mechanism includes a tensioner assembly configured to engage the first torque-transmission loop. The tensioner assembly may include a loop-tightening lever mounted for rotation relative to the frame, a tightening wheel rotatably mounted to the loop-tightening lever, and an adjustment mechanism attached to the loop-tightening lever and movable to adjust a position of the loop-tightening lever relative to the frame.

In some configurations of the fan apparatus of any of the above paragraphs, the adjustment mechanism includes a turnbuckle.

In some configurations of the fan apparatus of any of the above paragraphs, the belt pulley is mounted on the fan shaft.

In some configurations of the fan apparatus of any of the above paragraphs, the drive mechanism includes a belt-pulley-shaft mounted for rotation relative to the frame. The belt-pulley-shaft may be connected to the fan shaft by a second torque-transmission loop.

In some configurations of the fan apparatus of any of the above paragraphs, the drive mechanism includes a first belt-pulley-wheel mounted on the belt-pulley-shaft, a second belt-pulley-wheel mounted on the belt-pulley-shaft, and a belt-pulley-driven-wheel mounted on the fan shaft. The second torque-transmission loop may be engaged with the belt-pulley-driven-wheel and a selected on of the first and second belt-pulley-wheels.

In some configurations of the fan apparatus of any of the above paragraphs, the transport mechanism includes an axle mounted to the base and a plurality of wheels mounted on the axle to movably support the fan apparatus. The fan shaft may be parallel to the axle.

In another form, the present disclosure provides a fan apparatus that includes a frame, a fan, and a drive assembly. The fan is supported for rotation relative to the frame and includes a fan shaft and a plurality of blades extending outward from the fan shaft. The drive assembly is configured to drive the fan shaft. The drive assembly includes a drive shaft and means for adjusting a drive ratio between the drive shaft and the fan shaft.

In some configurations of the fan apparatus of the above paragraph, the fan apparatus includes a base supporting the frame, the fan, and the drive assembly. The base may include a transport mechanism configured to facilitate transportation of the fan apparatus.

In some configurations of the fan apparatus of the above paragraph, the transport mechanism includes a plurality of wheels that movably support the fan apparatus.

In some configurations of the fan apparatus of any of the above paragraphs, the base includes a jack stand. The jack stand can be lowered to stabilize the fan apparatus while the fan is rotating. The jack stand can also be raised to allow movement of the base.

In some configurations of the fan apparatus of any of the above paragraphs, the transport mechanism includes a plurality of skids that movably support the fan apparatus.

In some configurations of the fan apparatus of any of the above paragraphs, the means for adjusting the drive ratio between the drive shaft and the fan shaft includes: a driven wheel mounted on the fan shaft; a first drive wheel mounted on the drive shaft; a second drive wheel mounted on the drive shaft; and a first torque-transmission loop engaged with the driven wheel and a selected one of the first and second drive wheels.

In some configurations of the fan apparatus of any of the above paragraphs, the driven wheel, the first drive wheel, and the second drive wheel can be sprockets, gears, and/or pulleys, for example, and the first torque-transmission loop can be a chain or a belt, for example.

In some configurations of the fan apparatus of any of the above paragraphs, the means for adjusting the drive ratio between the drive shaft and the fan shaft includes a third drive wheel. The first torque-transmission loop is able to selectively engage the third drive wheel. The third drive wheel may be a sprocket, a gear, or a pulley, for example.

In some configurations of the fan apparatus of any of the above paragraphs, the means for adjusting the drive ratio between the drive shaft and the fan shaft includes a variable-speed pulley and a belt.

In some configurations, the fan apparatus of any of the above paragraphs includes a belt pulley drivingly coupled to the fan shaft. In a first operational mode, the fan shaft can be driven by a belt engaging the belt pulley. In a second operational mode, the fan shaft can be driven by the drive assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
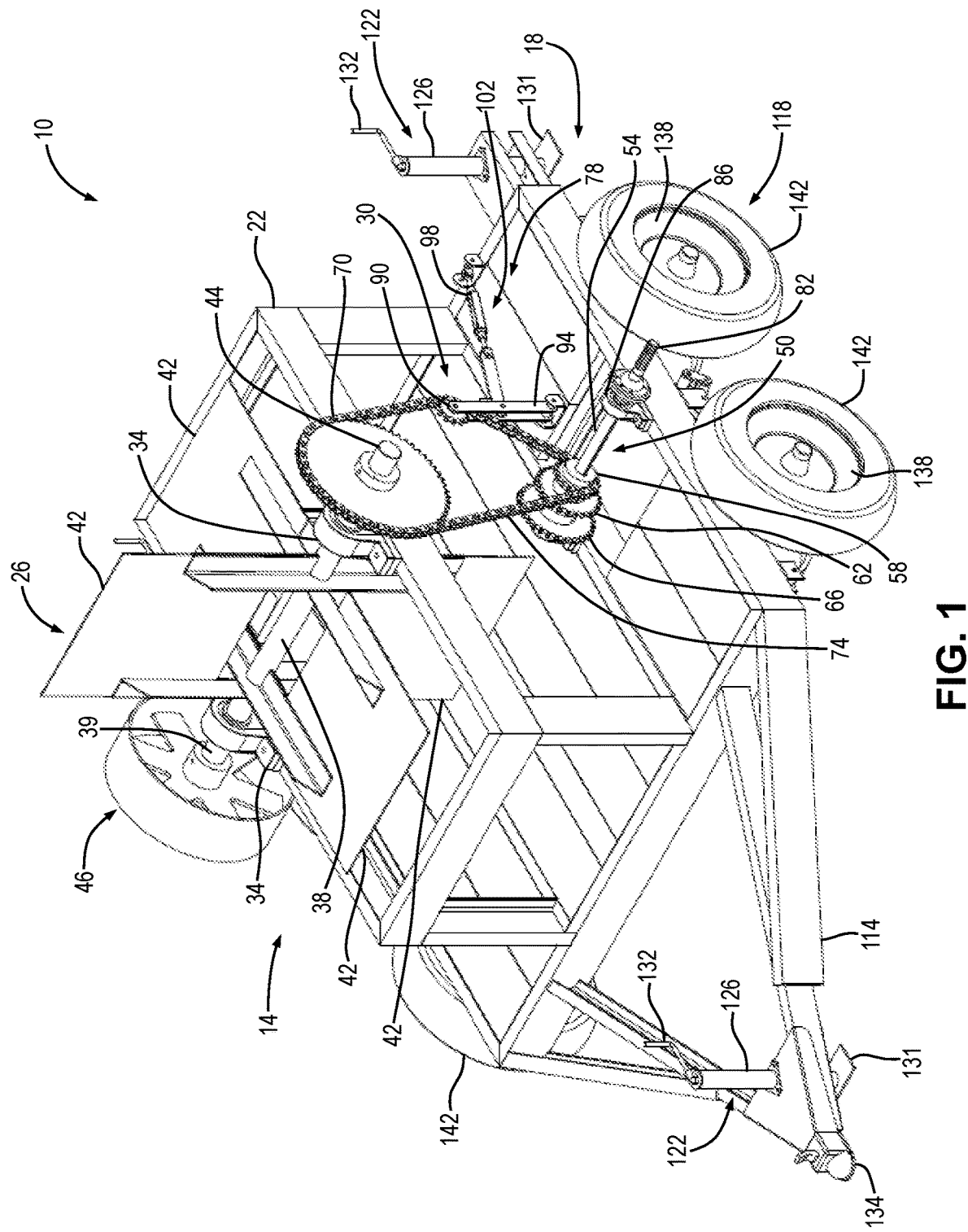
FIG. 1 is a perspective view of a fan apparatus according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-17, a fan apparatus 10 is provided. The fan apparatus 10 includes a fan assembly 14 and a base 18 (e.g., a movable base or a stationary base). An engine (e.g., a tractor engine) can be drivingly coupled to the fan assembly 14 to provide a load for breaking in the engine or maintaining the engine.

Figure 2:
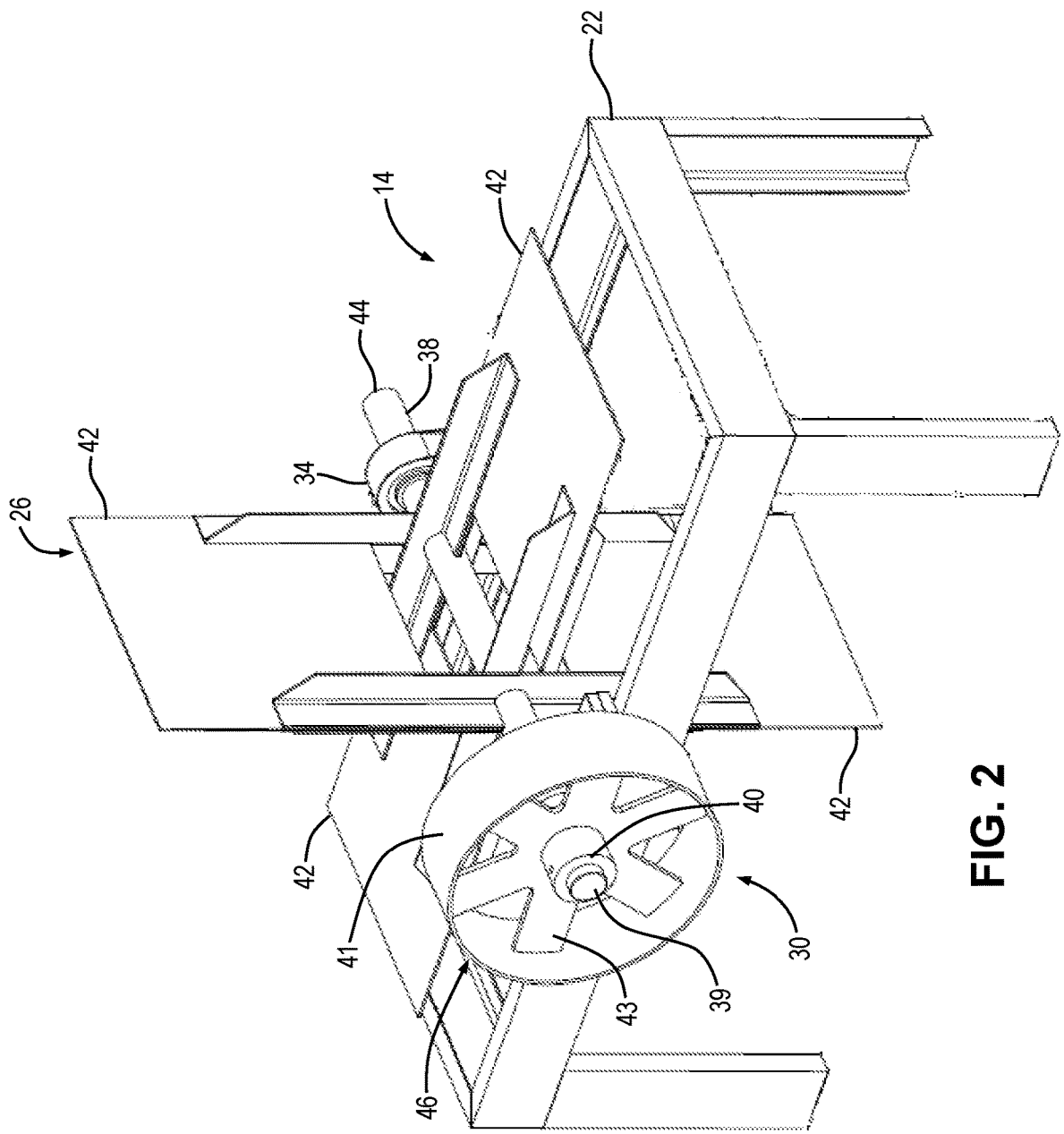
FIG. 2 is a perspective view of a fan assembly and a frame of the fan apparatus.

As shown in FIG. 2, the fan assembly 14 includes a frame 22, a fan 26, and a drive mechanism 30. The frame 22, which may be a rigid construction of bars, beams, planks, boards, and/or rods, rests atop of the base 18 and supports the fan 26 and the drive mechanism 30. The frame 22 may include axle support collars 34 that house bearings that rotatably support a fan shaft 38 of the fan 26.

Figure 3:
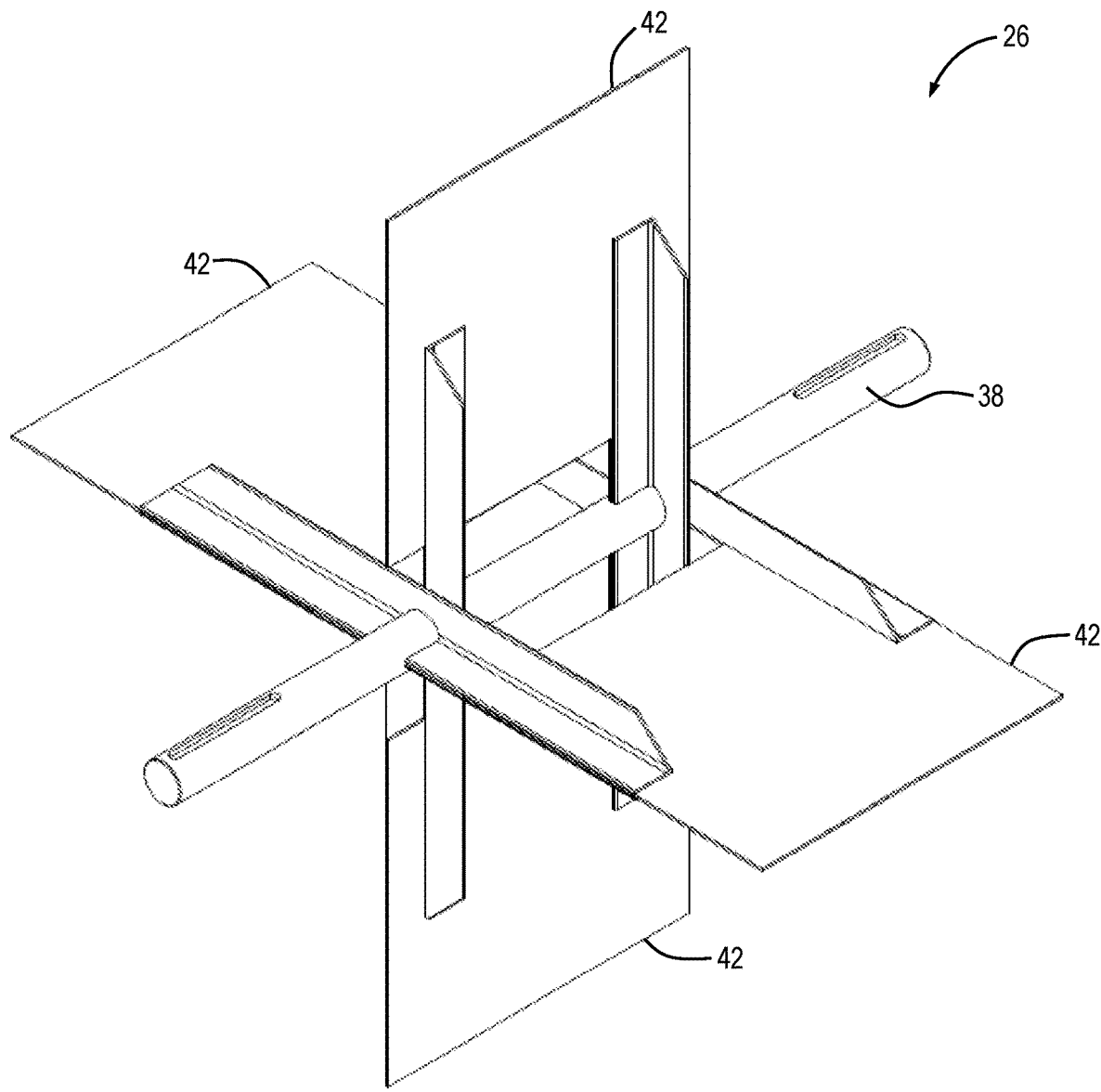
FIG. 3 is a perspective view of a fan of the fan apparatus.
Figure 4:
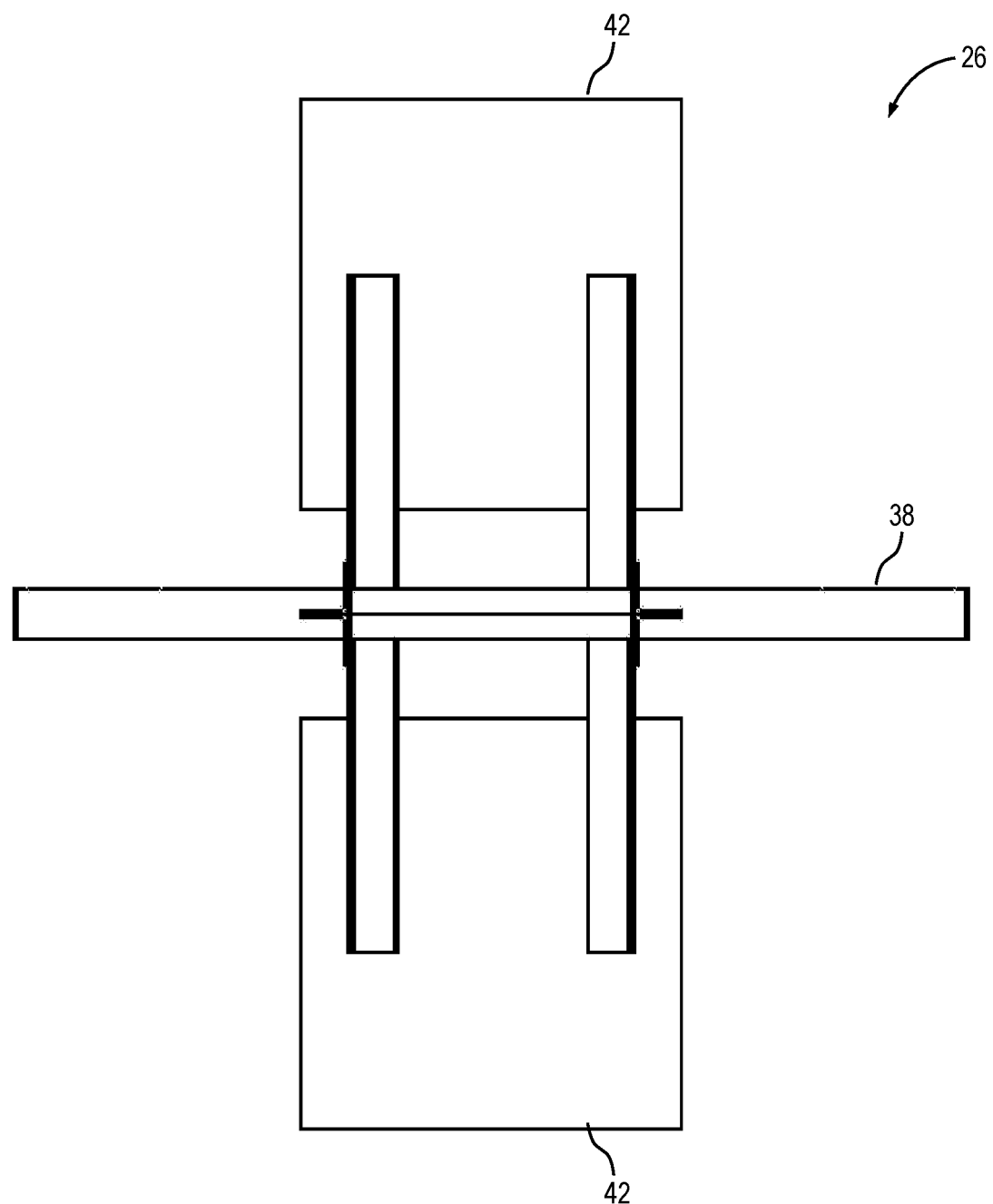
FIG. 4 is a side view of the fan of FIG. 3.

As shown in FIGS. 3 and 4, the fan 26 includes the fan shaft 38 and a plurality of fan blades 42. The fan shaft 38 defines a rotational axis of the fan 26 and is supported by the axle support collars 34 of the frame 22 for rotation about the rotational axis. The fan blades 42 may be fixedly attached to the fan shaft 38 and extend radially outward from an intermediate portion of the fan shaft 38. The fan blades 42 may be disposed between the axle support collars 34.

As shown in FIGS. 1 and 5-7, the drive mechanism 30 may include a belt pulley 46 and a drive assembly (i.e., a power transmission system) 50. The belt pulley 46 may be mounted on the fan shaft 38 (e.g., on a first end 39 of the fan shaft 38. As shown in FIG. 2, the belt pulley 46 may include a central hub 40, an outer rim 41, and a support structure 43. The central hub 40 may be fixedly mounted on the first end 39 of the fan shaft 38. The support structure 43 is fixed to the central hub 40 and the outer rim 41 and extends radially therebetween. The support structure 43 may include a plurality of spokes or a disc. The outer rim 41 may be a cylindrical, annular member that surrounds the support structure 43 and the central hub 40.

The drive assembly (power transmission system) 50 is configured to drive the fan shaft 38 and includes means for adjusting a drive ratio between an input speed (e.g., a rotational speed of a drive shaft 54 of the drive assembly 50) and an output speed (e.g., a rotational speed of the fan shaft 38). The drive assembly 50 may include power transmitting elements such as one or more of: sprockets, gears, pulleys, chains (single strand and/or multi-strand chains), belts (e.g., V-belts, flat belts, and/or timing belts), and/or gear trains, for example. As used herein, the terms "drive wheel," "driven wheel," and "tightening wheel" should be understood as including any one or more of: sprockets, gears, and pulleys. As used herein, the term "torque-transmission loop" should be understood as including any one or more of: chains (single strand and/or multi-strand chains), belts (e.g., V-belts, flat belts, and/or timing belts). In some configurations, the drive assembly 50 may include a system of gears that cooperate to adjust the drive ratio of the input speed to the output speed.

In the example shown in FIGS. 1-17, the drive assembly 50 may include a drive shaft 54, a first drive wheel (e.g., a sprocket, gear or pulley) 58, a second drive wheel (e.g., a sprocket, gear or pulley) 62, a third drive wheel (e.g., a sprocket, gear or pulley) 66, a driven wheel (e.g., a sprocket, gear or pulley) 70, a torque-transmission loop 74 (e.g., a chain (single-strand chain or multi-strand chain) or a belt (e.g., a flat belt, V-belt, or timing belt)), and a tensioner assembly 78. The drive shaft 54 may be mounted to the base 18 for rotation relative to the base 18. For example, axle support collars 86 may be mounted to the base 18 or frame 22 and may house bearings that rotatably support the drive shaft 54. The drive shaft 54 may be configured to be connected to an output shaft of an engine (e.g., a power-take-off shaft (not shown) of the engine of a tractor). For example, a first end of the drive shaft 80 may include a coupling 82, such as that shown in FIG. 8, which can be releasably connected to the power-take-off shaft of the engine of the tractor. For example, the coupling 82 may be splined to matingly engage with a shaft drive by the tractor's power-take-off.

The first, second, and third drive wheels 58, 62, 66 may be mounted on the drive shaft 54. For example, the drive shaft 54 may extend through central apertures of the first, second, and third drive wheels 58, 62, 66 such that the drive shaft 54 and the first, second, and third drive wheels 58, 62, 66 rotate together about a common rotational axis (defined by the drive shaft 54). The first, second, and third drive wheels 58, 62, 66 may have outer diameters (and in embodiments where the wheels are sprockets, the outer diameters have teeth 67) configured to engage the torque-transmission loop 74. The outer diameters of the drive wheels 58, 62, 66 may be different sizes and have different numbers of teeth 67. For example, the first drive wheel 58 may have a first outer diameter, the second drive wheel 62 may have a second outer diameter that is larger than the first outer diameter (and more teeth that the first drive sprocket 58), and the third drive wheel 66 may have a third outer diameter that is larger than the first and second outer diameters (and more teeth that the first and second drive wheels 58, 62). While the drive assembly 50 shown in the figures includes three drive wheels 58, 62, 66, in other configurations, the drive assembly 50 could have more than three drive wheels or fewer than three drive wheels. In other configurations, the drive assembly 50 could include one or more variable-speed pulleys (or sheaves) to adjust the drive ratio between the drive shaft 54 and the fan shaft 38 instead of or in addition to the sprockets, gears, or pulleys described above.

The driven wheel 70 may be mounted on the fan shaft 38 (e.g., at or near a second end 44 of the fan shaft 38 opposite the first end 39). The driven wheel 70 may have an outer diameter that is larger than the first, second, and third outer diameters of the first, second, and third drive wheels 58, 62, 66, respectively.

The torque-transmission loop 74 can be a roller chain or belt, for example. The torque-transmission loop 74 may be engaged with the driven wheel 70 and a selected one of the first, second, and third drive wheels 58, 62, 66. That is, a user of the fan apparatus 10 can choose one of the first, second, and third drive wheels 58, 62, 66 to be engaged with the torque-transmission loop 74. The selected one of the drive wheels 58, 62, 66 can be chosen based on the torque and power output of the tractor's engine and a desired load that the user wants the fan apparatus 10 to apply to the engine. That is, when the torque-transmission loop 74 is engaged with the first drive wheel 58 and the driven wheel 70, the torque-transmission loop 74 drivingly couples the drive shaft 54 to the fan 26 at a first drive ratio. When the torque-transmission loop 74 is engaged with the second drive wheel 62 and the driven wheel 70, the torque-transmission loop 74 drivingly couples the drive shaft 54 to the fan 26 at a second drive ratio that is different from the first drive ratio. When the torque-transmission loop 74 is engaged with the third drive wheel 66 and the driven wheel 70, the torque-transmission loop 74 drivingly couples the drive shaft 54 to the fan 26 at a third drive ratio that is different from the first and second drive ratios.

The tensioner assembly 78 is provided to maintain proper tension in the torque-transmission loop 74, regardless of which of the drive wheels 58, 62, 66 are engaged with the torque-transmission loop 74 at any given time. The tensioner assembly 78 may include a tightening wheel (e.g., a sprocket, gear or pulley) 90, a loop-tightening lever 94, and an adjustment mechanism 98. The tightening wheel 90 is supported by the loop-tightening lever 94 and is freely rotatable relative thereto.

Figure 5:
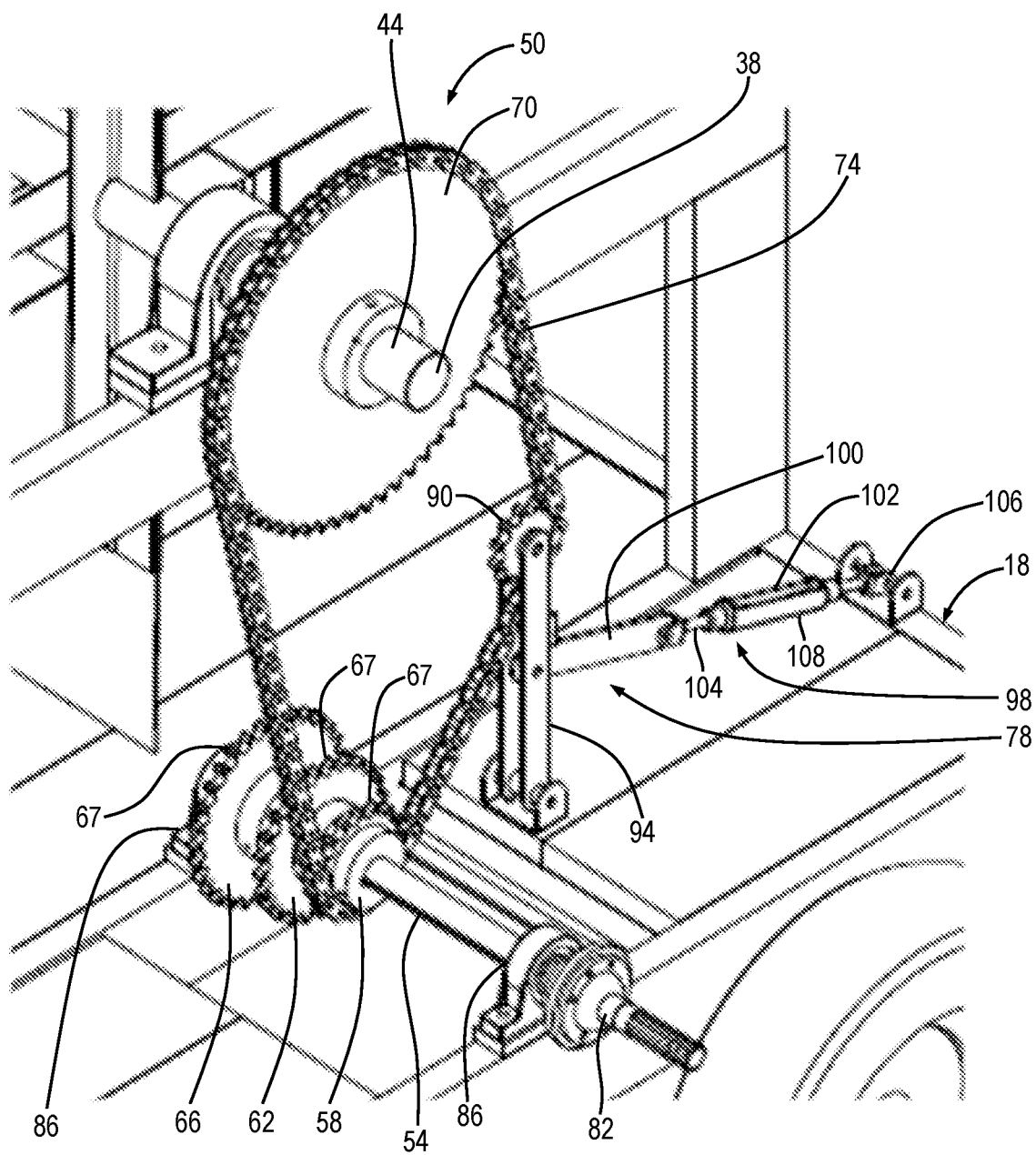
FIG. 5 is a perspective view of a drive assembly of the fan apparatus.

The loop-tightening lever 94 supports the tightening wheel 90 and may be mounted on either the frame 22 or the base 18. One end of the loop-tightening lever 94 may be rotatably mounted to the frame 22 or base 18 (e.g., via a pin and a yoke or clevis), and the opposite end of the loop-tightening lever 94 may rotatably support the tightening wheel 90 (e.g., via a pin). In some configurations, the loop-tightening lever 94 may include a pair of links that are parallel to each other and fixed relative to each other (as shown in FIG. 5). In other configurations, the loop-tightening lever 94 could include a single link (rather than a pair of links).

Figure 10:
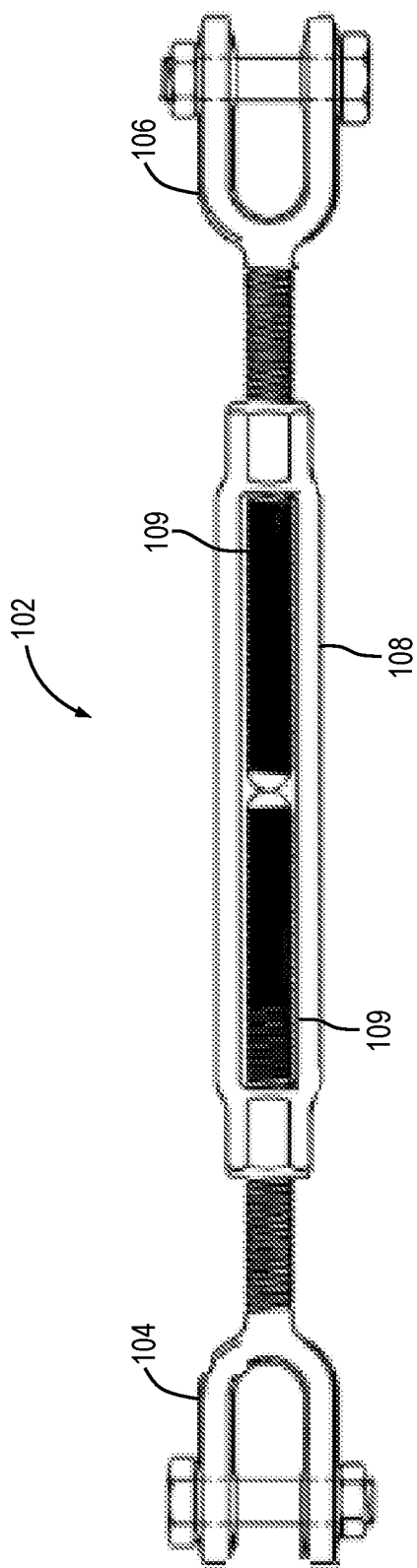
FIG. 10 is a side view of an adjustment mechanism of a tensioner assembly of the fan apparatus.

As shown in FIG. 5, the adjustment mechanism 98 may include a link 100 and a turnbuckle 102. One end of the link 100 may be rotatably coupled to the loop-tightening lever 94 and the other end of the link 100 may be rotatably coupled to the turnbuckle 102. As shown in FIG. 10, the turnbuckle 102 may include a first clevis 104, a second clevis 106, and a sleeve 108. Each of the clevises 104, 106 may include a threaded shaft 109. The threaded shafts 109 are threadably received in the sleeve 108. The first clevis 104 may be rotatably coupled to the link 100, and the second clevis 106 may be rotatably coupled to the base 18.

A user can adjust the length of the turnbuckle 102 (and hence, the length of the adjustment mechanism 98) by threadably adjusting the depths to which the threaded shafts 109 of the clevises 104, 106 are received in the sleeve 108. Adjusting the length of the turnbuckle 102 adjusts the position of the loop-tightening lever 94 and the tightening wheel 90. In this manner, the tension on the torque-transmission loop 74 can be adjusted as appropriate based on which of the drive wheels 58, 62, 66 are engaged with the torque-transmission loop 74.

While the adjustment mechanism 98 shown in the figures includes the link 100 and the turnbuckle 102, in some configurations, the adjustment mechanism 98 could include only the turnbuckle 102 (and not the link 100). In such configurations, the turnbuckle 102 may be connected directly to the loop-tightening lever 94. It will be appreciated that the adjustment mechanism 98 could include some other adjustment means instead of the turnbuckle 102. For example, the adjustment mechanism could include a rack-and-pinion mechanism and/or telescoping members that can adjust the length of the adjustment mechanism 98. Any other length-adjusting mechanism or linkage could also be employed.

Figure 11:
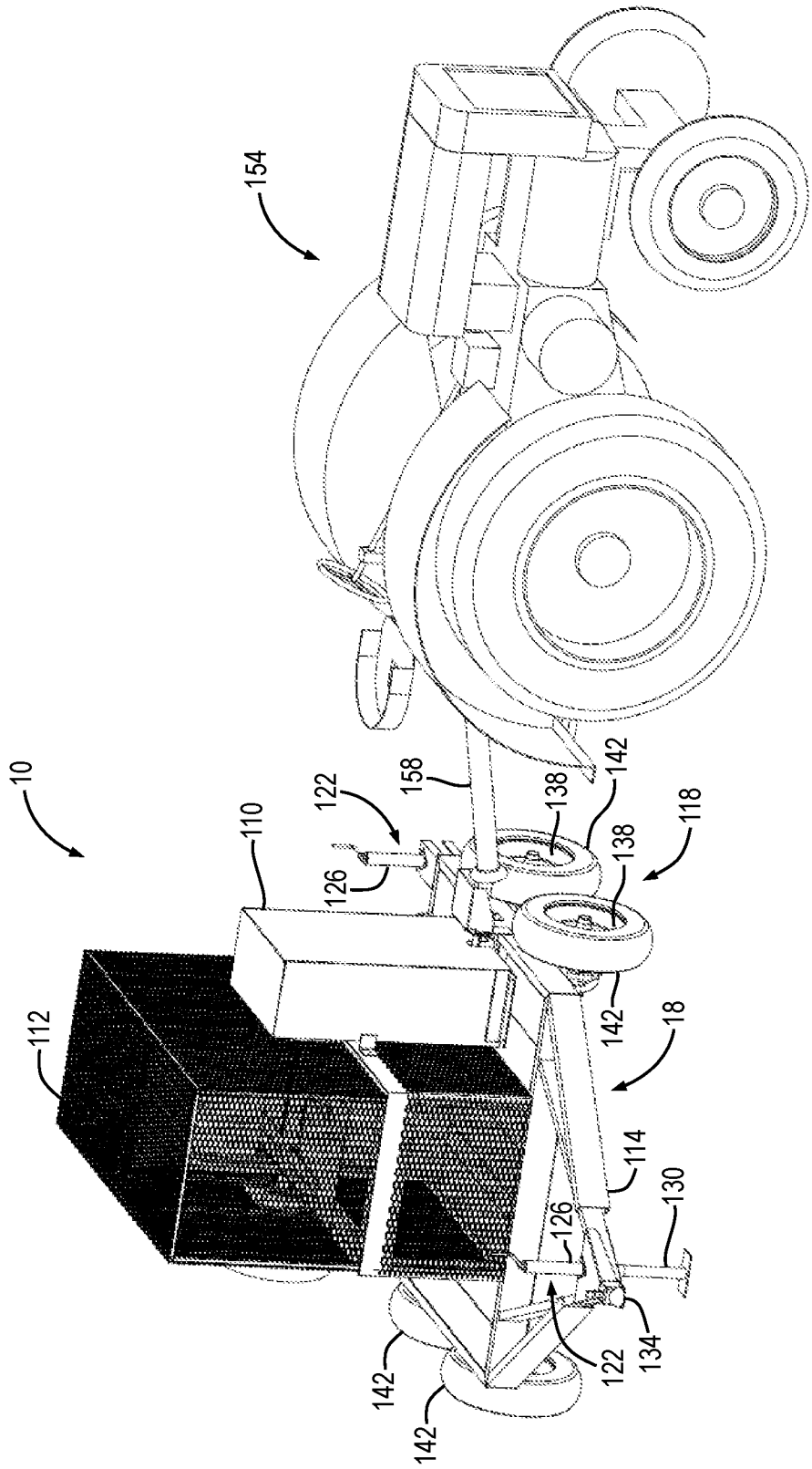
FIG. 11 is a perspective view of a tractor driving the drive assembly of the fan apparatus.
Figure 13:
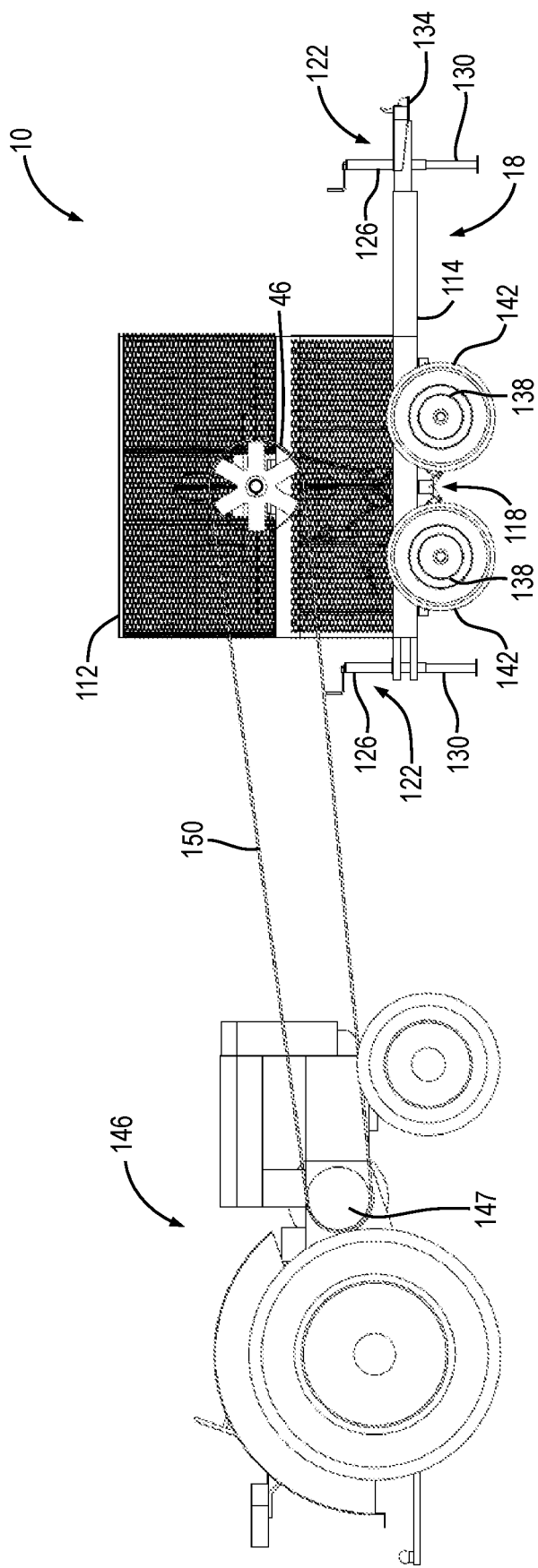
FIG. 13 is a side view of a tractor driving a belt pulley of the fan apparatus.

As shown in FIG. 11, the drive assembly 50 and tensioner assembly 78 may be encased in a protective box 110. This protective box 110 may include an aperture, which allows the drive shaft 54 to connect to an outside power source. The protective box 110 can be formed from sheet metal, plastic polymeric material, wood, or any other suitable material. Furthermore, as shown in FIGS. 11 and 13, a shell or cage 112 may enclose the fan assembly 14. The shell 112 may include an opening for the first shaft 38 to extend to the outside of the shell 112, so that the drive mechanism 30 can be coupled to a tractor's power-take-off or another external power source.

Figure 12:
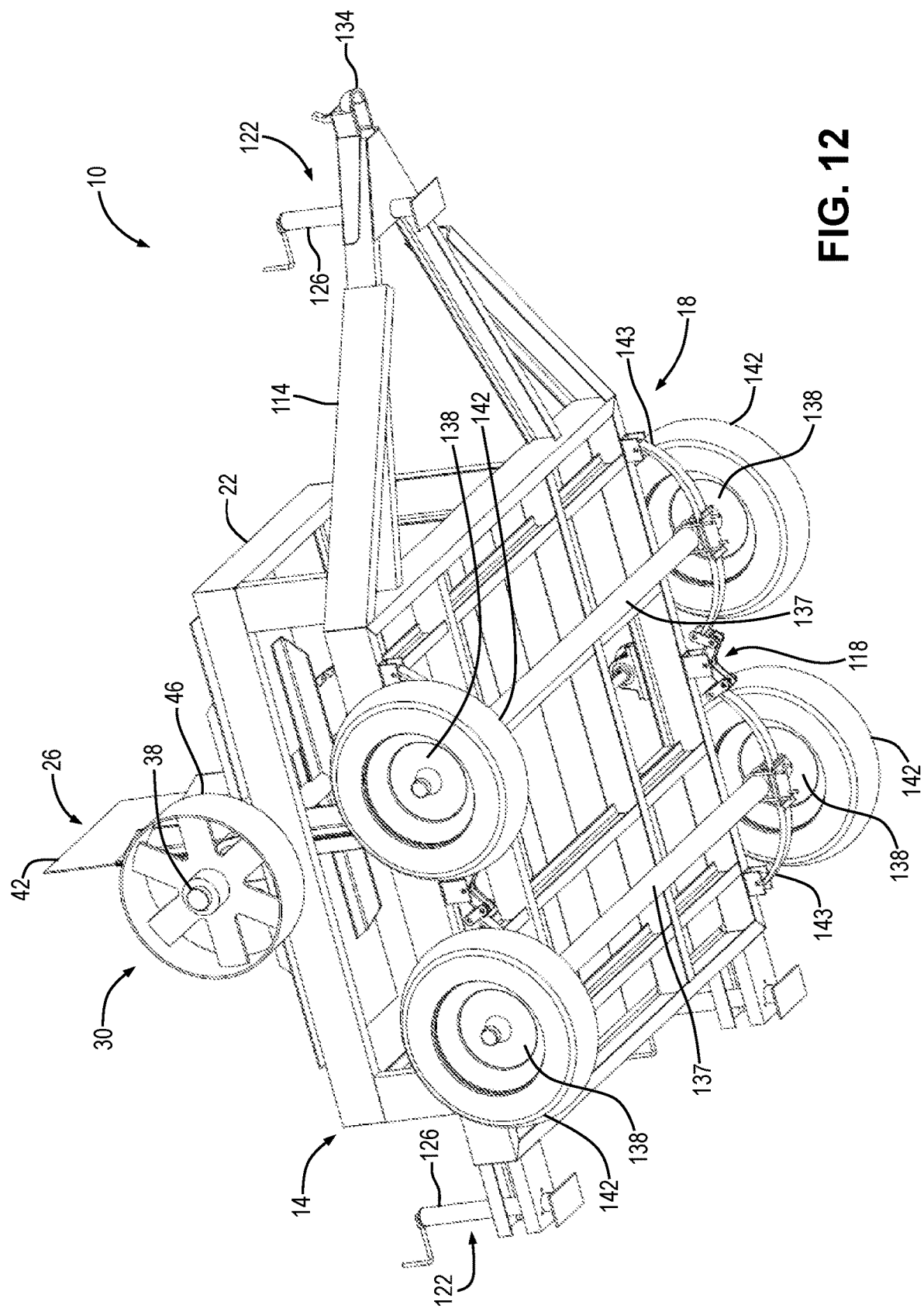
FIG. 12 is a perspective of the fan apparatus.

The base 18 can be a stationary base or the base 18 can be a movable base to facilitate transport of the fan apparatus 10. For example, the base 18 can be a wheeled trailer that can be pulled by an automobile, a tractor, or other vehicle. As shown in FIG. 12, the base 18 may include a base frame 114 and a transport mechanism 118. The base frame 114 may be a rigid construction of beams, bars, planks, boards, and/or rods that support the frame 22 of the fan assembly 14. The base frame 114 may include a plurality of jack stands 122. The jack stands 122 can each be moved between a retracted position (in which the jack stands 122 are spaced apart from a ground surface) and an extended position in which the jack stands 122 contact the ground surface). When all of the jack stands 122 are in the extended position, the jack stands 122 may provide a stable base that restricts or prevents movement of the base 18.

Figure 6:
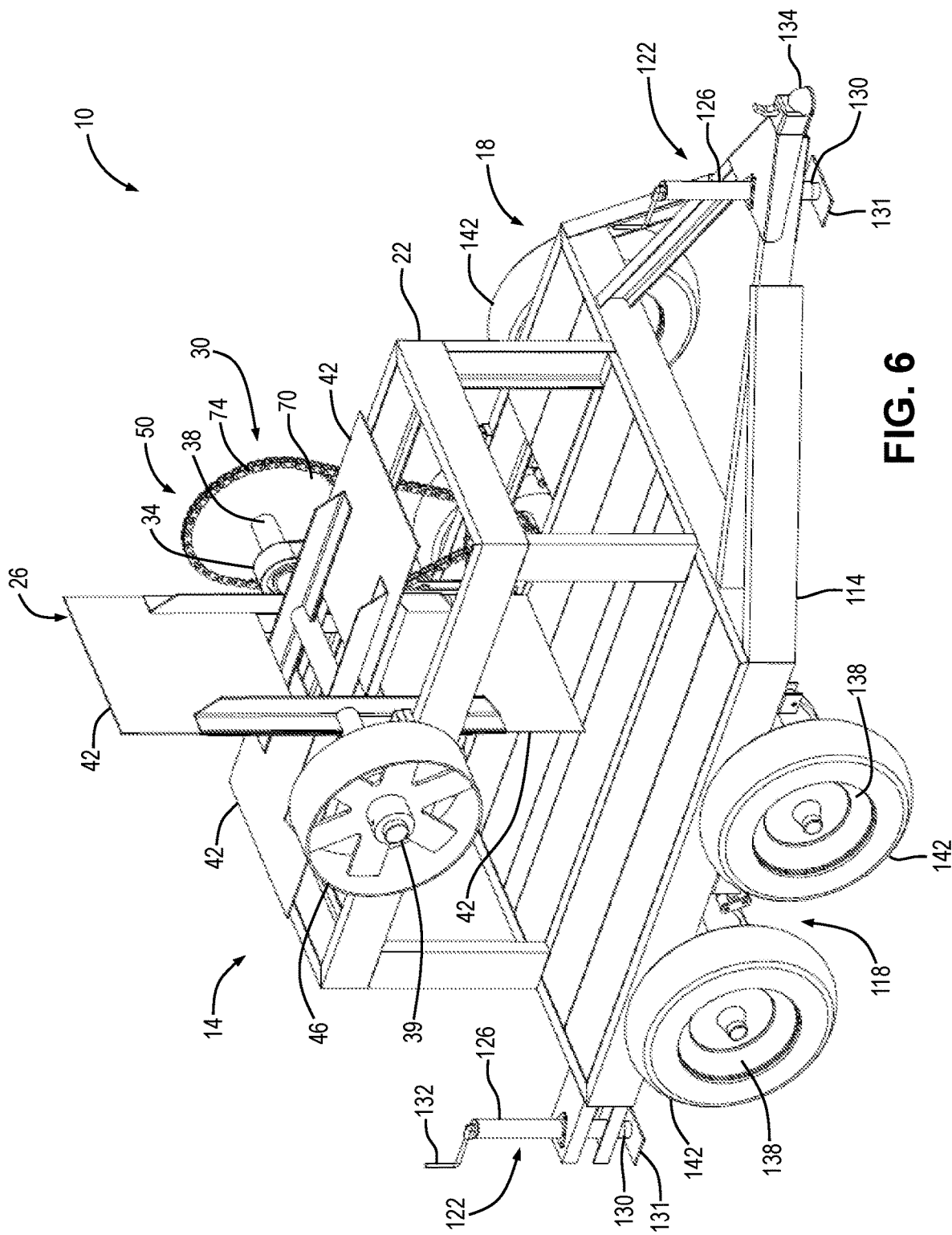
FIG. 6 is another perspective view of the fan apparatus.
Figure 7:
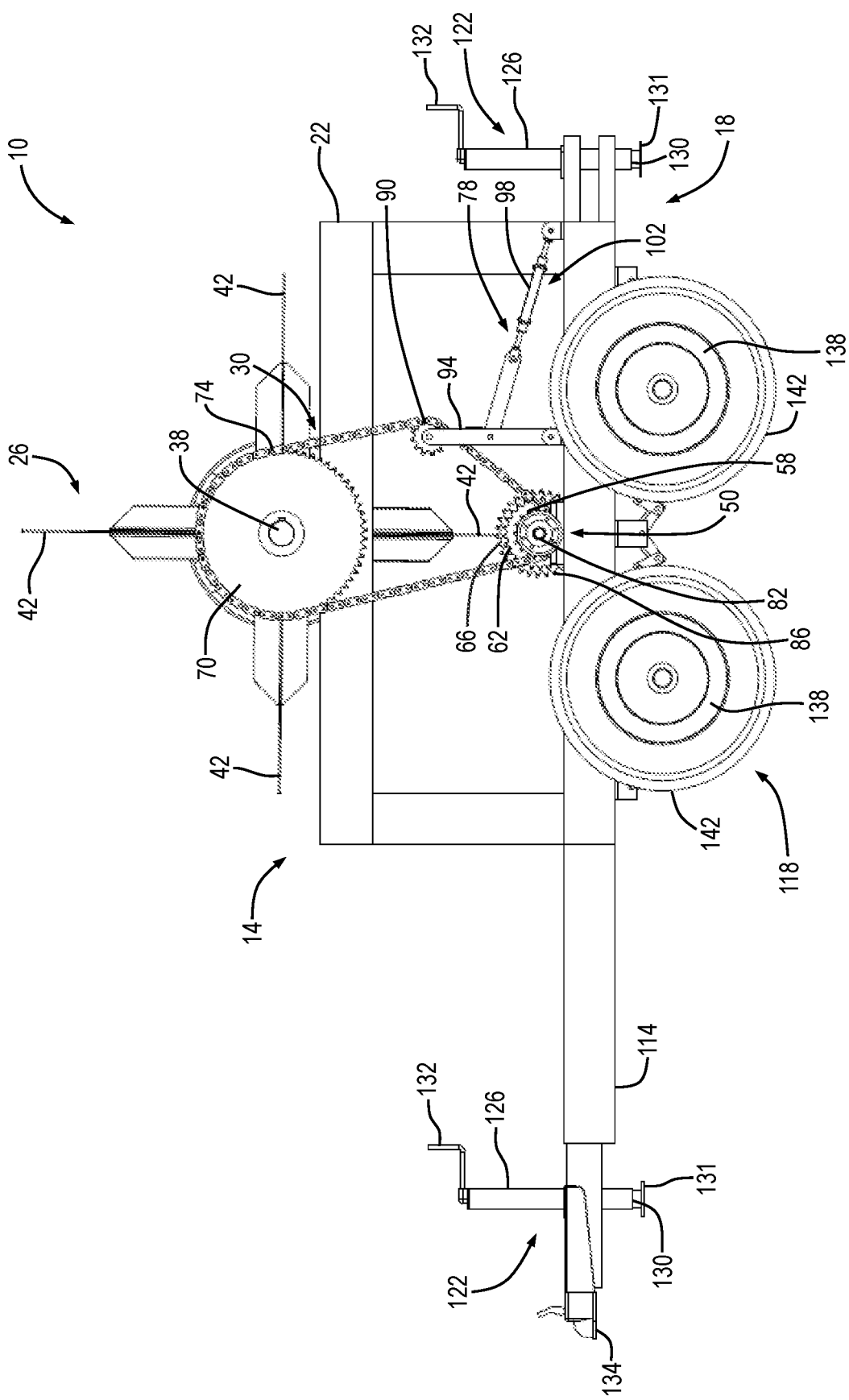
FIG. 7 is a side view of the fan apparatus.
Figure 8:
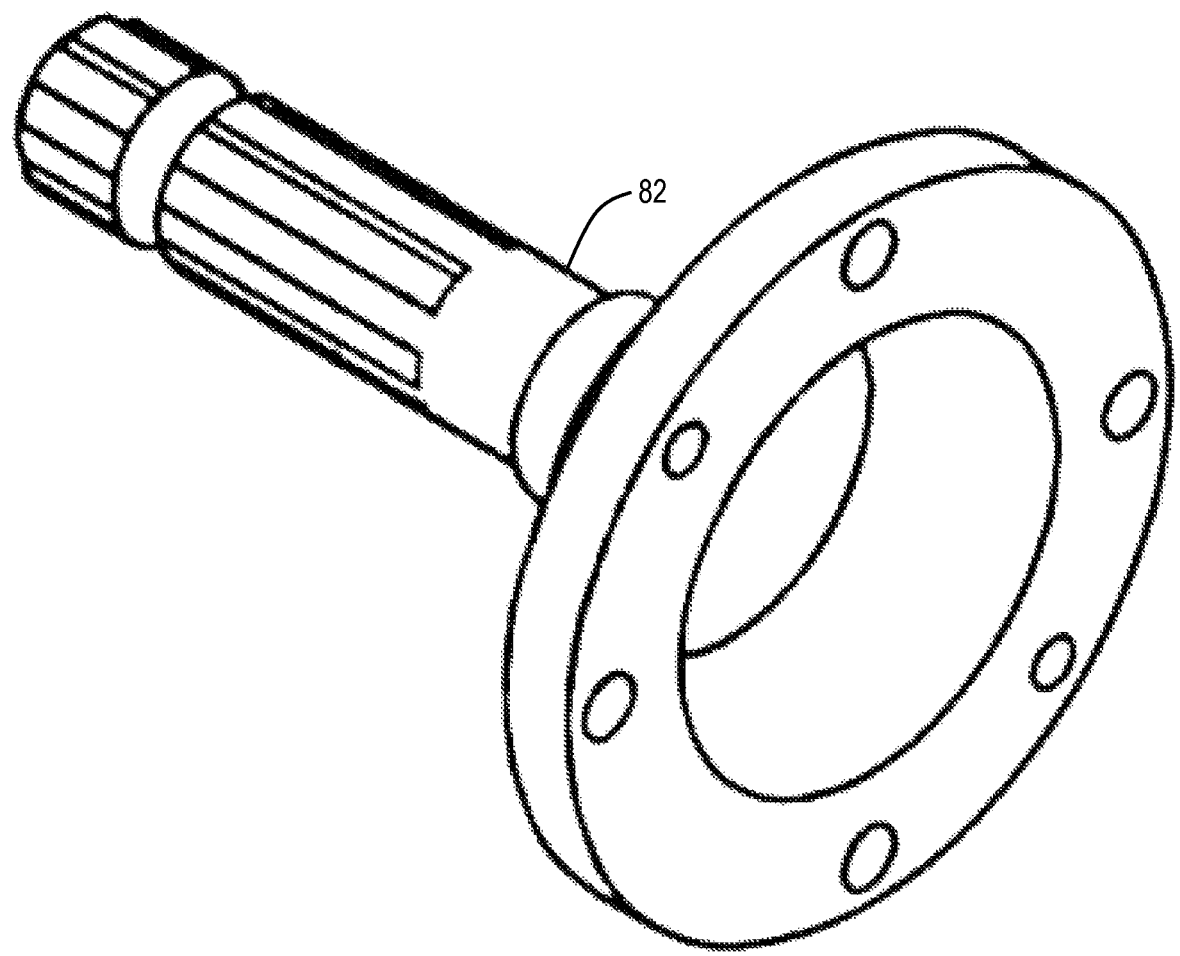
FIG. 8 is a perspective view of a coupling of the drive assembly of the fan apparatus.
Figure 9:
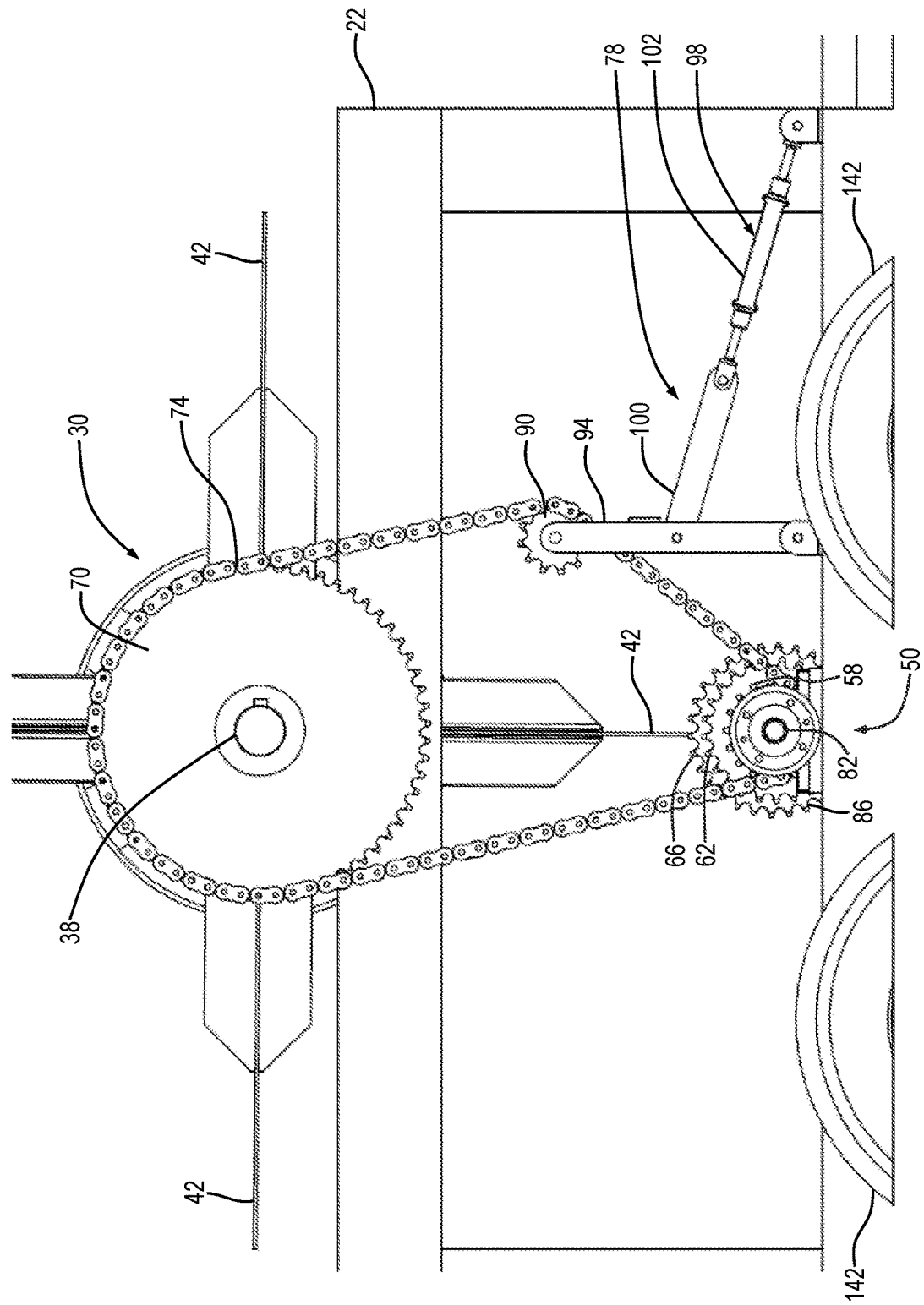
FIG. 9 is a side view of the drive assembly.

As shown in FIGS. 6 and 7, each of the jack stands 122 may include a first cylinder 126 and a second cylinder 130. The second cylinder 130 may be received within the first cylinder 126 (in a telescoping manner) and may move axially relative to the first cylinder 126 between the extended position and the retracted position. A first end of the second cylinder 130 may include a substantially flat plate 131 that can contact the ground surface to provide further stability on the ground when the jack stands 122 are in the extended position. The jack stands 122 may be actuated by a rotating handle 132, an electronic motor, or other means. The rotating handle 132, motor, or other actuation means can actuate a rack-and-pinion mechanism or any other mechanism suitable for moving the second cylinder 130 between the extended and retracted position. In addition, the base frame 114 may include a hitch receiver 134 or other means for fixing the fan apparatus 10 to an automobile, a tractor, or other vehicle.

As shown in FIG. 12, the transport mechanism 118 may include one or more axles 137 supporting a plurality of wheels 138, which roll on the ground when the fan apparatus 10 is being moved. The wheels 138 may include tires 142 to provide a smoother ride and improved traction during transport. Suspension members 143 (e.g., springs and/or shock absorbers) and bearings (not shown) may connect the axles 137 and wheels 138 to the base frame 114.

As described above, the fan assembly 14 can be driven by an external power source (e.g., a tractor engine) in multiple ways. That is, in one operational mode, the power source can be coupled to the belt pulley 46 (via a belt 150) to drive the fan 26 or, in another operational mode, the power source can be coupled to the drive shaft 54 of the drive assembly 50 (e.g., via a power-take-off shaft) to drive the fan 26. While the fan 26 is rotating, the fan blades 42 encounter wind resistance. This wind resistance will provide a resistive load on the power source, which may be the desired effect during breaking-in or maintenance of an engine.

Figure 14:
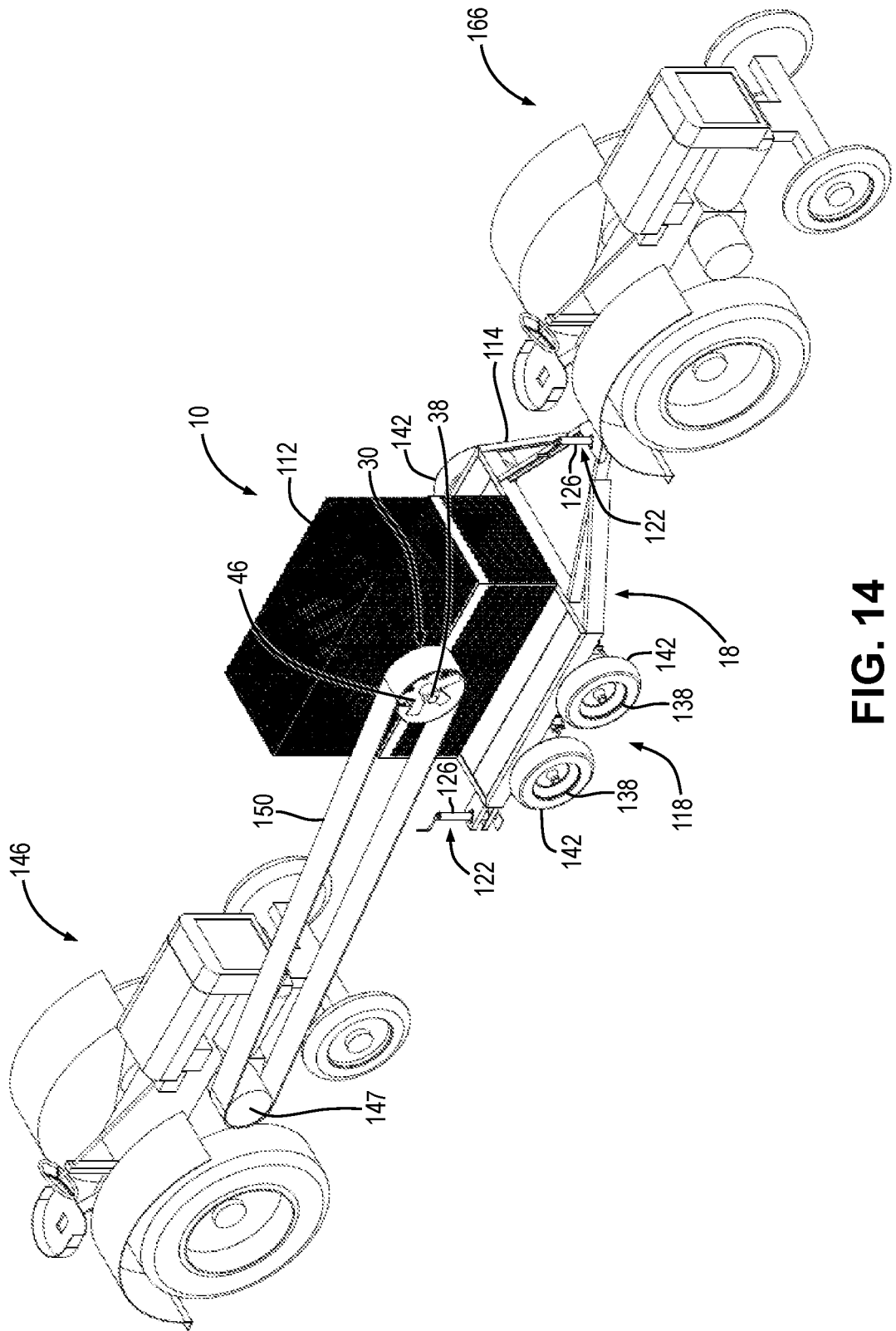
FIG. 14 is a perspective view of a first tractor engaged with the fan apparatus via a belt and a second tractor towing the fan apparatus.

FIGS. 13 and 14 depict a first tractor 146 that can power the fan assembly 14. The first tractor 146, or other power source, may be placed in a position an appropriate distance from the belt pulley 46 of the drive mechanism 30 to allow a flat belt 150 to be placed on the belt pulley 46 of the fan assembly 14 and a belt pulley 147 of the first tractor 146, simultaneously. The first tractor 146 can then be moved relative to the belt pulley 46 to provide proper tension in the belt 150. Thereafter, the transmission of the tractor 146 can be shifted to a neutral or park setting (i.e., so that the engine of the tractor 146 can be throttled without causing corresponding movement of the tractor 146) and the engine of the tractor 146 can be operated with the fan 26 providing a desired load on the engine for breaking-in or maintaining the engine.

Alternatively, with the belt 150 loosely engaging the belt pulley 46 of the fan assembly 14 and the belt pulley 147 of the first tractor 146, another vehicle 166 (e.g., a second tractor, an automobile, etc.) can pull the base 18 to position the fan assembly 14 at an appropriate distance from the first tractor 146 (while the tractor 146 stays stationary with its transmission in a park setting or neutral setting) to establish proper tension in the belt 150. That is, as shown in FIG. 14, the vehicle 166 can be coupled to the hitch receiver 134 of the base 18 and the fan apparatus 10 can be towed by the vehicle 166 to a position relative to the first tractor 146 that provides proper tension in the belt 150. Once the proper tension in the belt 150 is established, the jack stands 122 of the base 18 can be moved to the extended position to provide a stable base for the fan apparatus 10. Establishing the proper tension in the belt 150 by towing the fan apparatus 10 relative to the tractor 146 while the tractor 146 is stationary may be beneficial (as compared to moving the tractor 146 relative to the stationary fan apparatus 10 to establish the desired tension in the belt 150). This is because it can be difficult to shift the transmission of the tractor 146 out of a drive gear and into a neutral or park position when the belt 150 is tensioned (i.e., the tension in the belt 150 can resist movement of the transmission of the tractor 146 out of a drive gear).

As shown in the figures, the fan shaft 38 may be arranged parallel to the one or more axles 137 of the base 18. This allows the belt 150 to be tensioned when either: the tractor 146 is moved relative to the base 18 or the base 18 is moved relative to the tractor 146.

Figure 15:
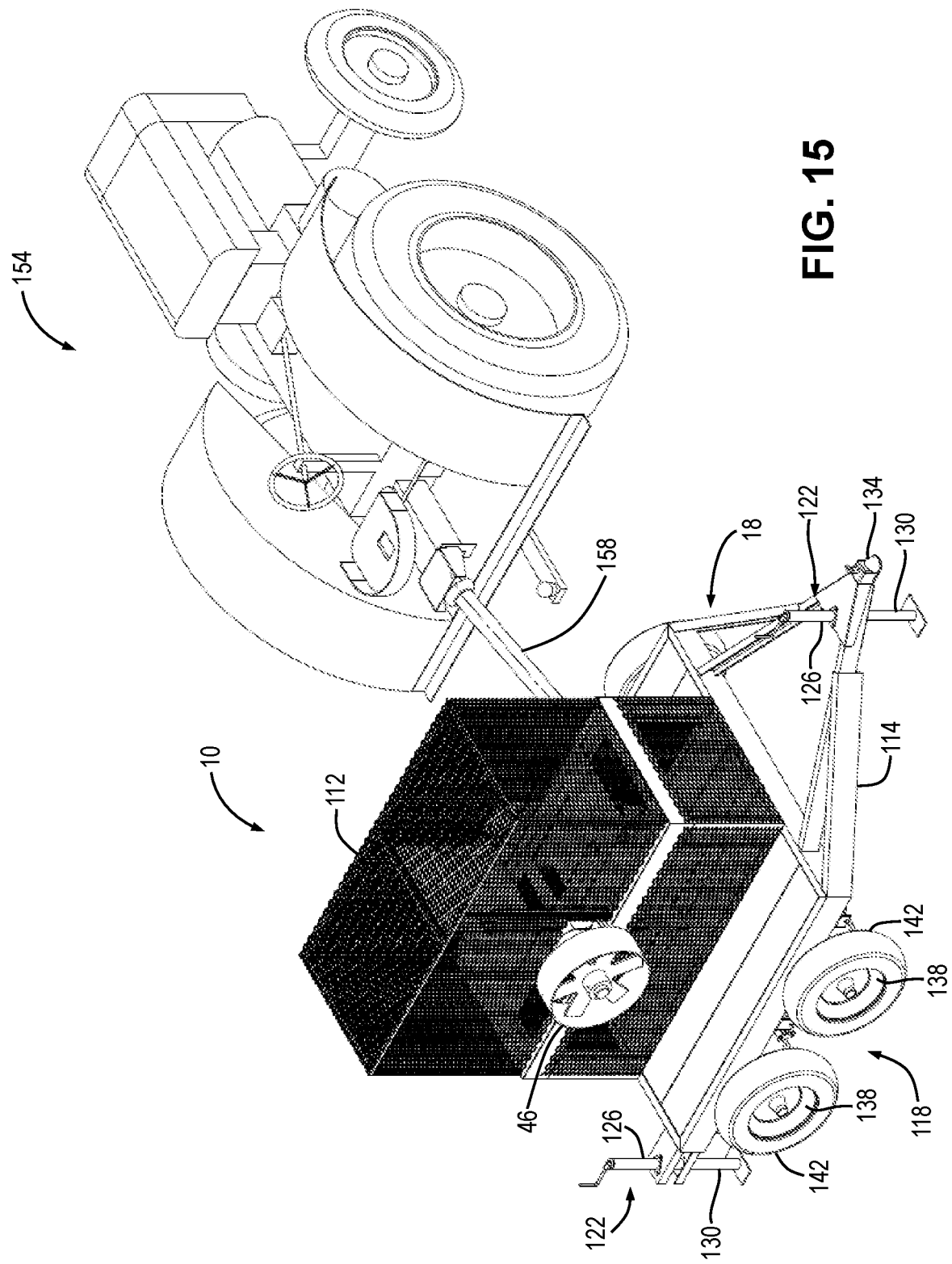
FIG. 15 is a perspective view of a tractor driving the drive assembly of the fan apparatus.
Figure 16:
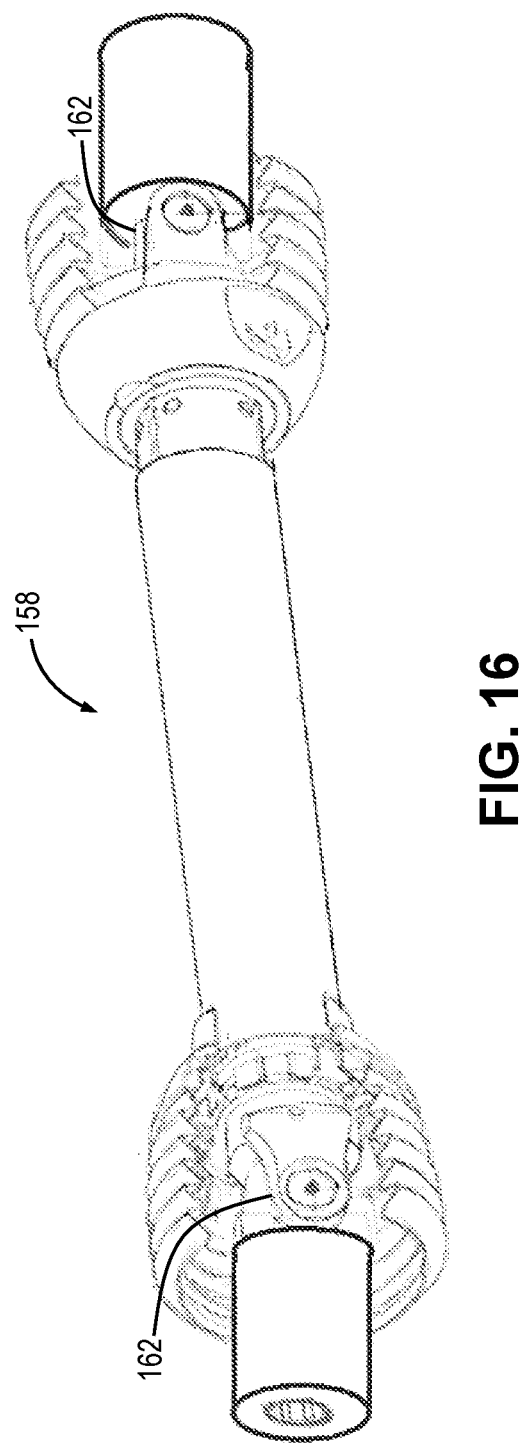
FIG. 16 is a perspective view of a connection shaft for coupling the drive assembly to a power-take-off shaft.

Alternatively, a power source may drive the fan 26 via the drive assembly 50. FIGS. 11 and 15 show a tractor 154 with its power-take-off shaft (which is driven by the engine of the tractor 154) connected to the drive shaft 54 of the drive assembly 50 via a connection shaft 158. Each end of the connection shaft 158 may include a universal joint 162 (FIG. 16). One of the universal joints 162 may be connected to the drive shaft 54 (or coupling 82 of the drive shaft 54) and the other universal joint 162 may be connected to the power-take-off shaft of the tractor 154.

In operation, the engine of the second tractor 154 will rotate the power-take-off shaft, which causes corresponding rotation of the connection shaft 158 and the drive shaft 54. As the drive shaft 54 rotates, the first drive wheel 58 (or whichever one of the drive wheels 58, 62, 66 is engaged with the torque-transmission loop 74) drives the torque-transmission loop 74, which drives the driven wheel 74 and the shaft 38 of the fan 26. In this manner, wind resistance on the fan blades 42 provides a load to the engine of the second tractor 154.

As described above, a user may want to adjust the drive ratio (or gear ratio) of the drive assembly 50 to provide a desired amount of load for an engine driving the fan assembly 14. The user can change the drive ratio by changing which of the drive wheels 58, 62, 66 is engaged with the torque-transmission loop 74 (and by adjusting the tensioner assembly 78 to provide proper tension in the torque-transmission loop 74). The operator may manually change which of the drive wheels 58, 62, 66 is engaged with the torque-transmission loop 74. In some configurations, the fan apparatus 10 may include a powered gear-changing system configured to remove the torque-transmission loop 74 from one of the drive wheels 58, 62, 66 and engage the torque-transmission loop 74 with another of the drive wheels 58, 62, 66.

The torque-transmission loop 74 may have a tighter or looser fit around the driven wheel 70, tightening wheel 90, and chosen drive wheel 58, 62, 66, depending on the size of the chosen drive wheel 58, 62, 66. The tensioner assembly 78 may be utilized to alter the tension in the torque-transmission loop 74 when a drive wheel has been selected. In situations where the torque-transmission loop 74 is being moved to a larger one of the drive wheels 62, 66 (i.e., from the first drive wheel 58 to one of the second or third drive wheels 62, 66 or from the second drive wheel 62 to the third drive wheel 66), the loop-tightening lever 94 may be rotated in a direction (e.g., by lengthening the adjustment mechanism 98) that moves the tightening wheel 90 toward the drive shaft 54. In situations where the torque-transmission loop 74 is being moved to a smaller one of the drive wheels 58, 62 (i.e., from the third drive wheel 66 to one of the first or second drive wheels 58, 62 or from the second drive wheel 62 to the first drive wheel 58), the loop-tightening lever 94 may be rotated in a direction (e.g., by shortening the adjustment mechanism 98) that moves the tightening wheel 90 away from the drive shaft 54.

Figure 17:
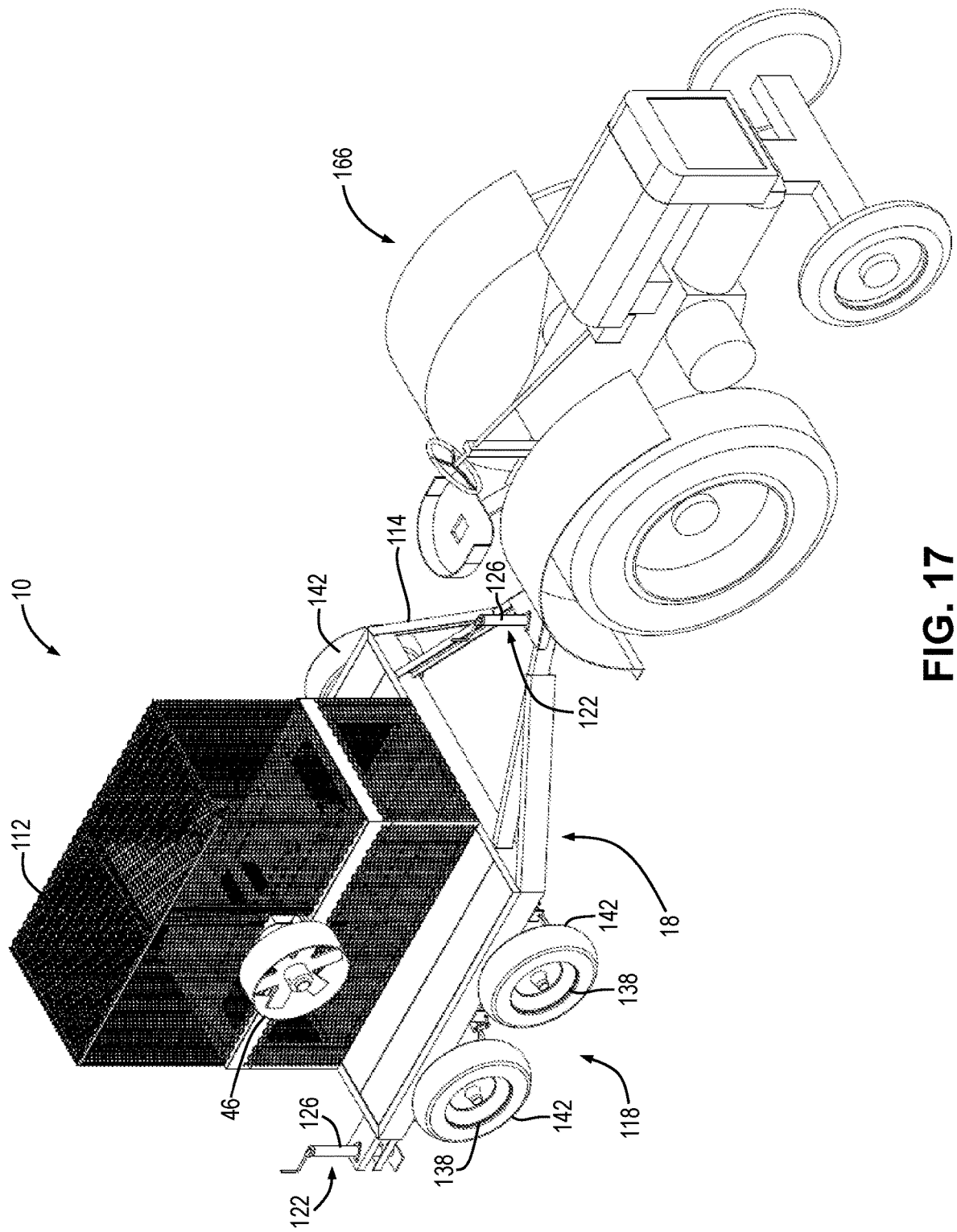
FIG. 17 is a perspective view of a tractor towing the fan apparatus.

As described above, the wheels 138 on the base 18 make transporting the fan apparatus 10 relatively easy. As shown in FIGS. 14 and 17, the hitch receiver 134 of the base 18 of the fan apparatus 10 may be adjoined to a hitch (not shown) of the vehicle 166. This configuration allows the vehicle 166 to pull the fan apparatus 10. In some configurations, the base 18 may be configured for on-road use. That is, the base 18 may include taillights, brake lights, and any other components for street-legal towing. In some configurations, the base 18 could include a braking system.

Figure 18:
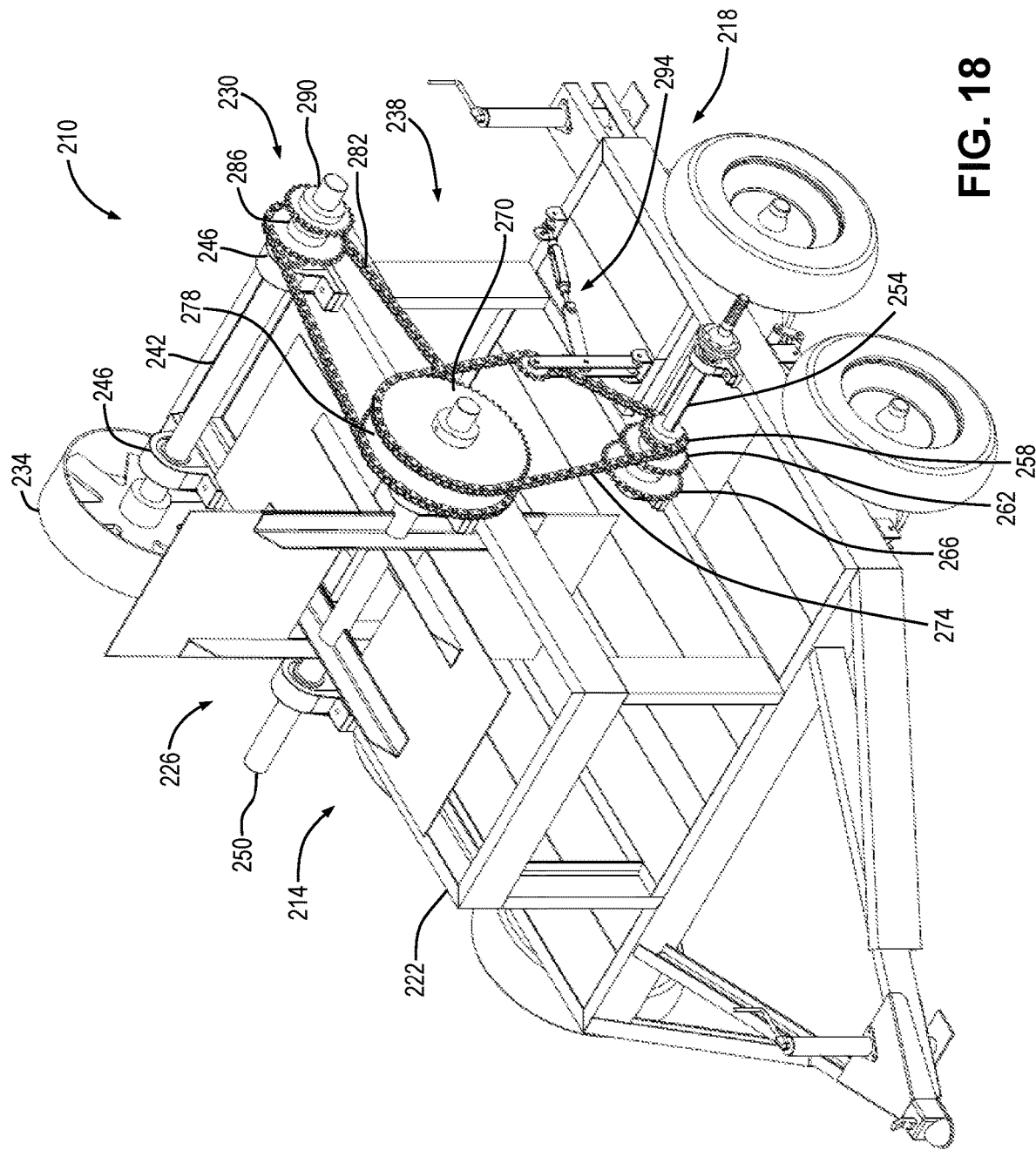
FIG. 18 is a perspective view of another fan apparatus according to the principles of the present disclosure.
Figure 19:
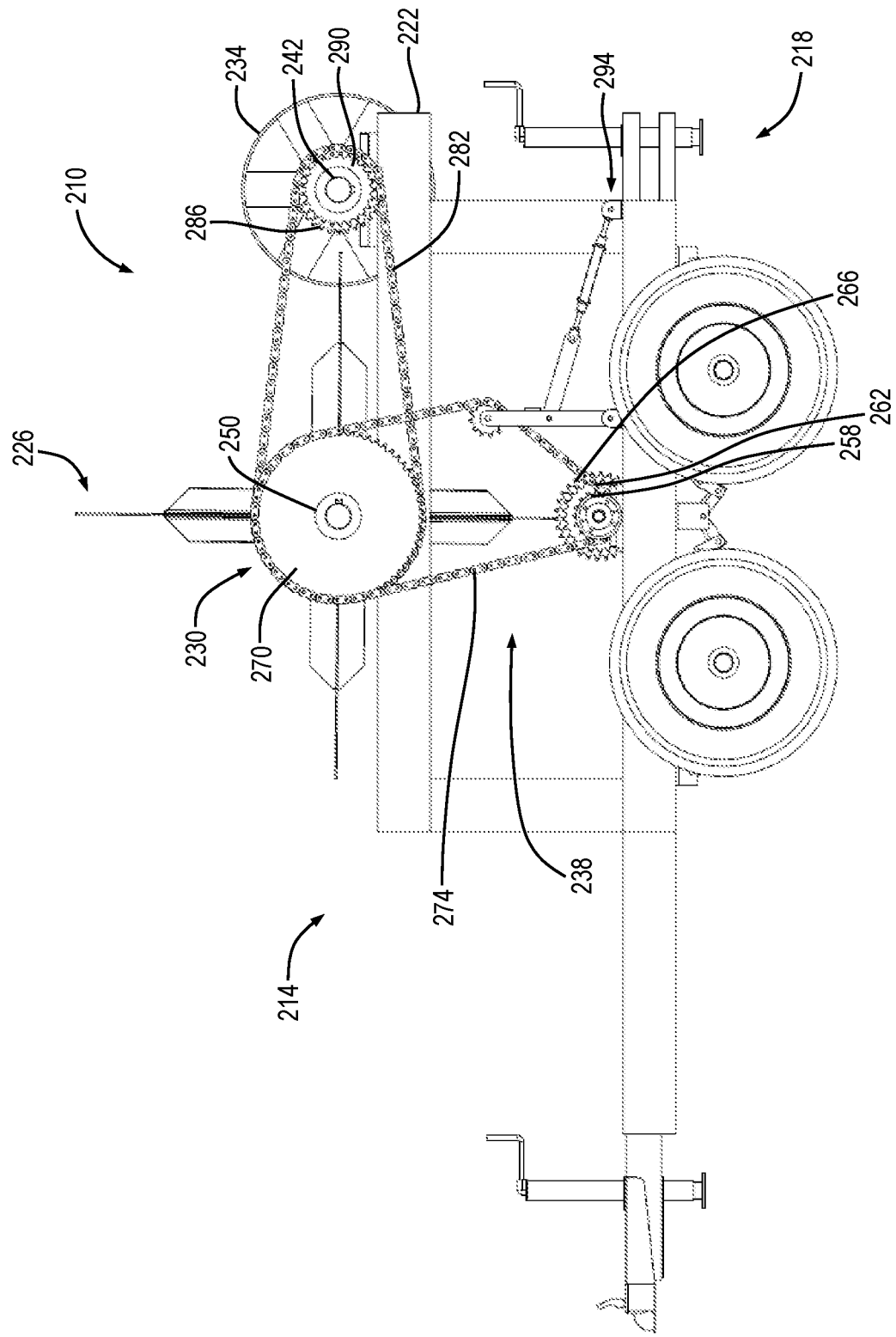
FIG. 19 is a side view of the fan apparatus of FIG. 17.
Figure 20:
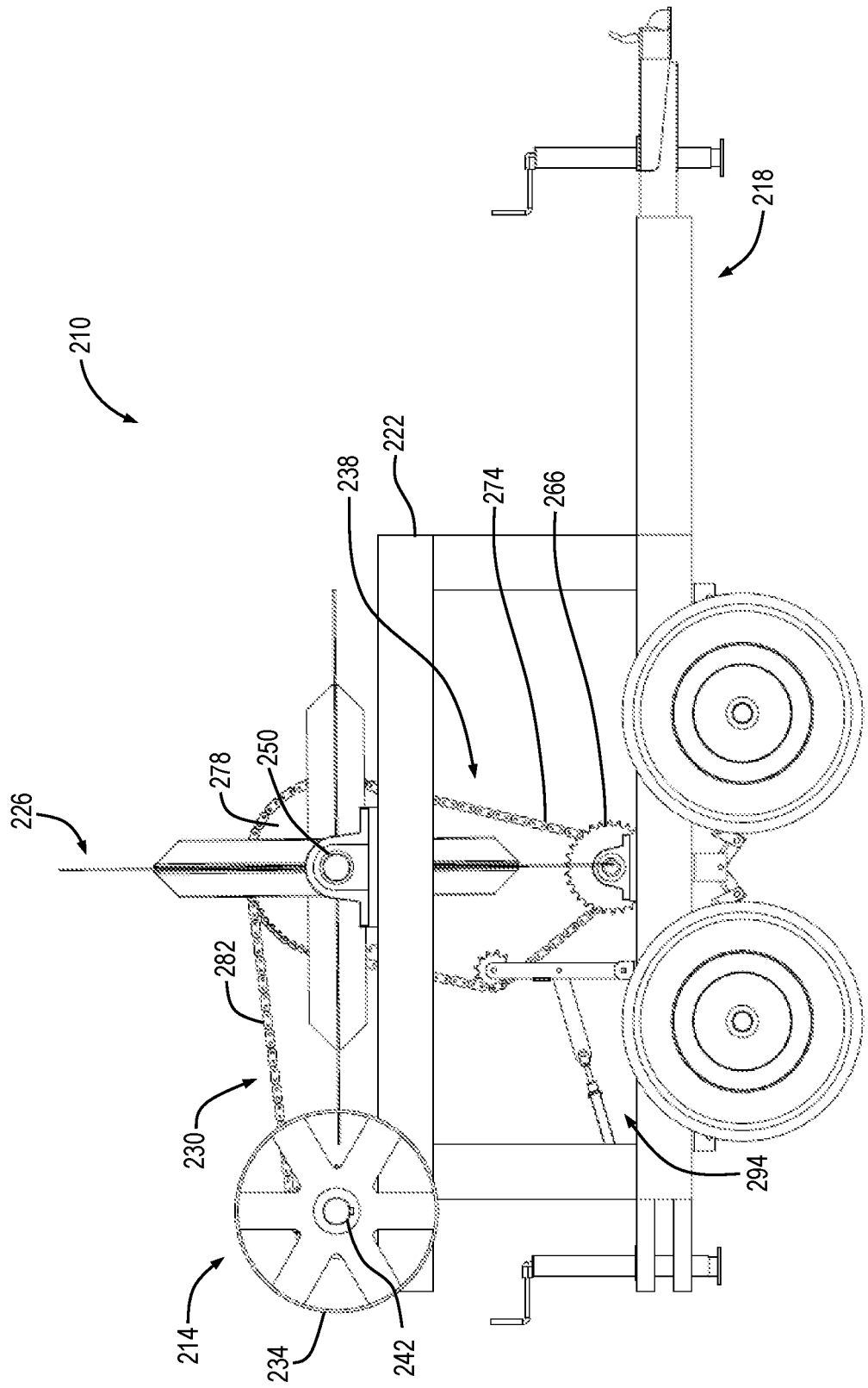
FIG. 20 is another side view of the fan apparatus of FIG. 17.

With reference to FIGS. 18-20, another fan apparatus 210 is provided. The structure and function of the fan apparatus 210 may similar or identical to that of the fan apparatus 10 described above, except for differences described below and/or shown in the figures.

Like the fan apparatus 10, the fan apparatus 210 may include a fan assembly 214 and a base 218. The fan assembly 214 may include a frame 222, a fan 226, and a drive mechanism 230. The structure and function of the frame 222, the fan 226, and the base 218 may be similar or identical to that of the frame 22, fan 26, and base 18 described above.

The drive mechanism 230 may include a belt pulley 234, a drive assembly 238, and a belt-pulley-shaft 242. The belt-pulley-shaft 242 may be rotatably supported by a pair of axle support collars 246 mounted on the frame 222. The axle support collars 246 may house bearings that allow the belt-pulley-shaft 242 to rotate relative to the frame 222. The belt-pulley-shaft 242 may be parallel to and spaced apart from fan shaft 250 of the fan 226. The belt pulley 234 (which may be similar or identical to the belt pulley 46) may be mounted on a first end of the belt-pulley-shaft 242.

A first belt-pulley-wheel 286 and a second belt-pulley-wheel 290 may be mounted on the belt-pulley-shaft 242 at or near a second end of the belt-pulley-shaft 242. The first belt-pulley-wheel 286 may have a larger diameter (and more teeth) than the second belt-pulley-wheel 290. A belt-pulley-driven-wheel 278 may be mounted on the fan shaft 250. A torque-transmission loop 282 (e.g., a roller chain (single-strand or multi-strand chain) or belt (e.g., flat belt or V-belt)) may engage the belt-pulley-driven-wheel 278 and a selected one of the first and second belt-pulley-wheels 286, 290. In a similar manner as described above with respect to the drive assembly 50, the user can select one of the first and second belt-pulley-wheels 286, 290 for engagement with the torque-transmission loop 282 to achieve a desired drive ratio (or gear ratio) between the belt pulley 234 and the fan shaft 250. In some configurations, the fan apparatus 210 could include a tensioner assembly (similar to the tensioner assembly described above) to maintain a desired tension on the torque-transmission loop 282.

The structure and function of the drive assembly 238 may be similar or identical to that of the drive assembly 50 described above. Briefly, the drive assembly 238 may include a drive shaft 254, first drive wheel 258, a second drive wheel 262, a third drive wheel 266, a driven wheel 270 (disposed on the fan shaft 250 adjacent the belt-pulley-driven-wheel 278), a torque-transmission loop 274 (e.g., a chain (single-strand chain or multi-strand chain) or belt (e.g., flat belt or V-belt)), and a tensioner assembly 294. The drive shaft 254, wheels 258, 262, 266, 270, torque-transmission loop 274, and tensioner assembly 294 may be similar or identical to the drive shaft 54, wheels 58, 62, 66, 70, torque-transmission loop 74, and tensioner assembly 78 described above.

Figure 21:
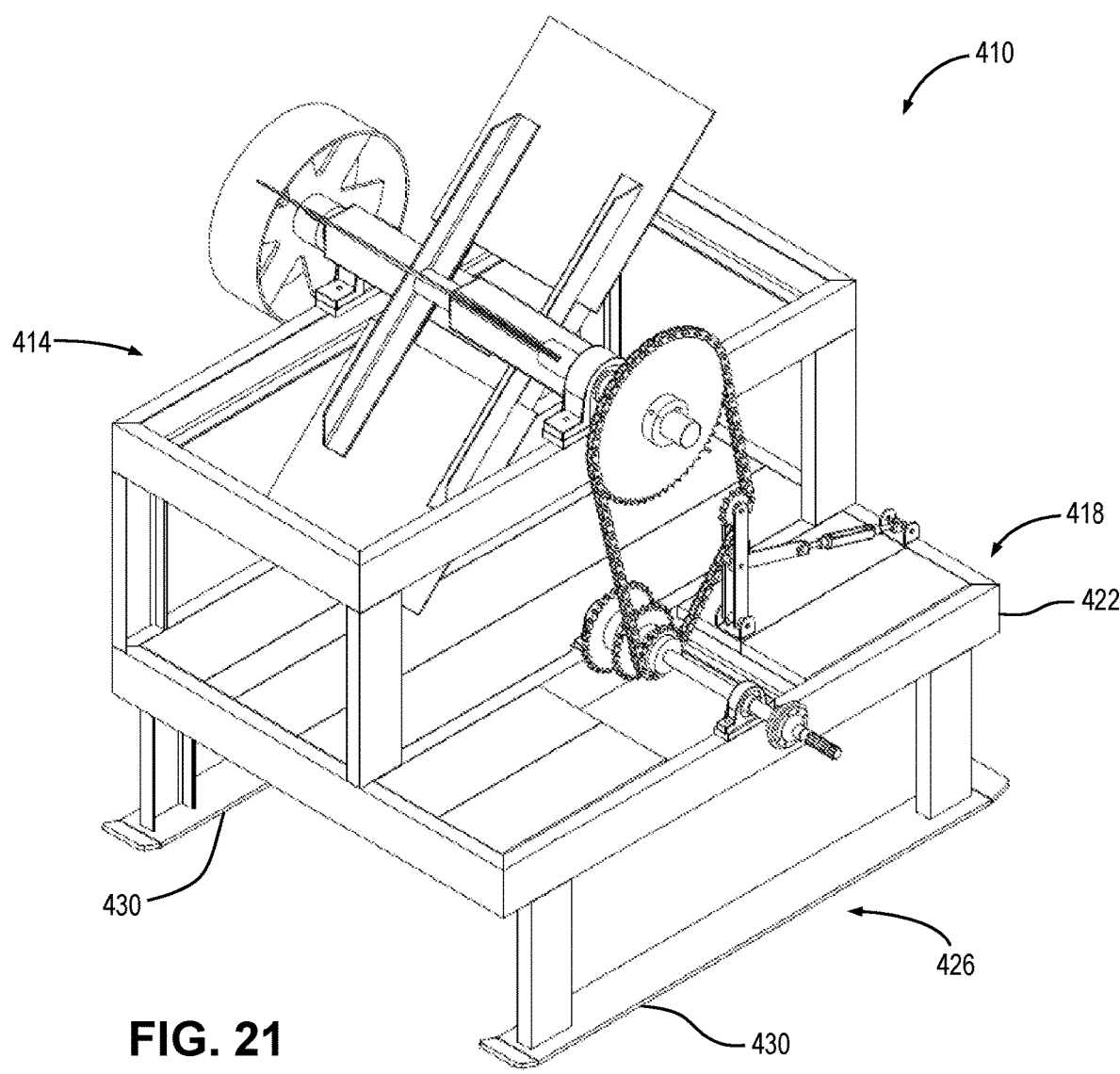
FIG. 21 is a perspective view of yet another fan apparatus according to the principles of the present disclosure.

With reference to FIG. 21, another fan apparatus 410 is provided. The fan apparatus 410 may include a fan assembly 414 and a base 418. The structure and function of the fan assembly 414 can be similar or identical to that of the fan assembly 14, 214. The base 418 may include a frame 422 and a transport mechanism 426. The transport mechanism 426 can include a plurality of skids 430 fixed to the frame 422. In other configurations, the transport mechanism 426 can include wheels, castors, or tracks instead of or in addition to the skids 430.

The skids 430 may be elongated beams or planks, for example. The skids allow the fan apparatus 410 to be slid along the ground when pulled. The skids 430 may be fixed underneath the base frame 422, such that the skids 430 rest on the ground. The base 418 may be adjoined to a vehicle (e.g., by one or more ropes, chains, or straps, for example) and pulled by the vehicle to a desired location. Alternatively, the fan apparatus 410 could be lifted and moved by a forklift, crane, or hoist, for example.

While the drawings show the fan apparatuses 10, 210, 410 being driven by an engine of a tractor, it will be appreciated that the fan apparatuses 10, 210, 410 could be coupled to a stationary engine (e.g., an engine not installed in any vehicle) to break in the engine.

Figure 22:
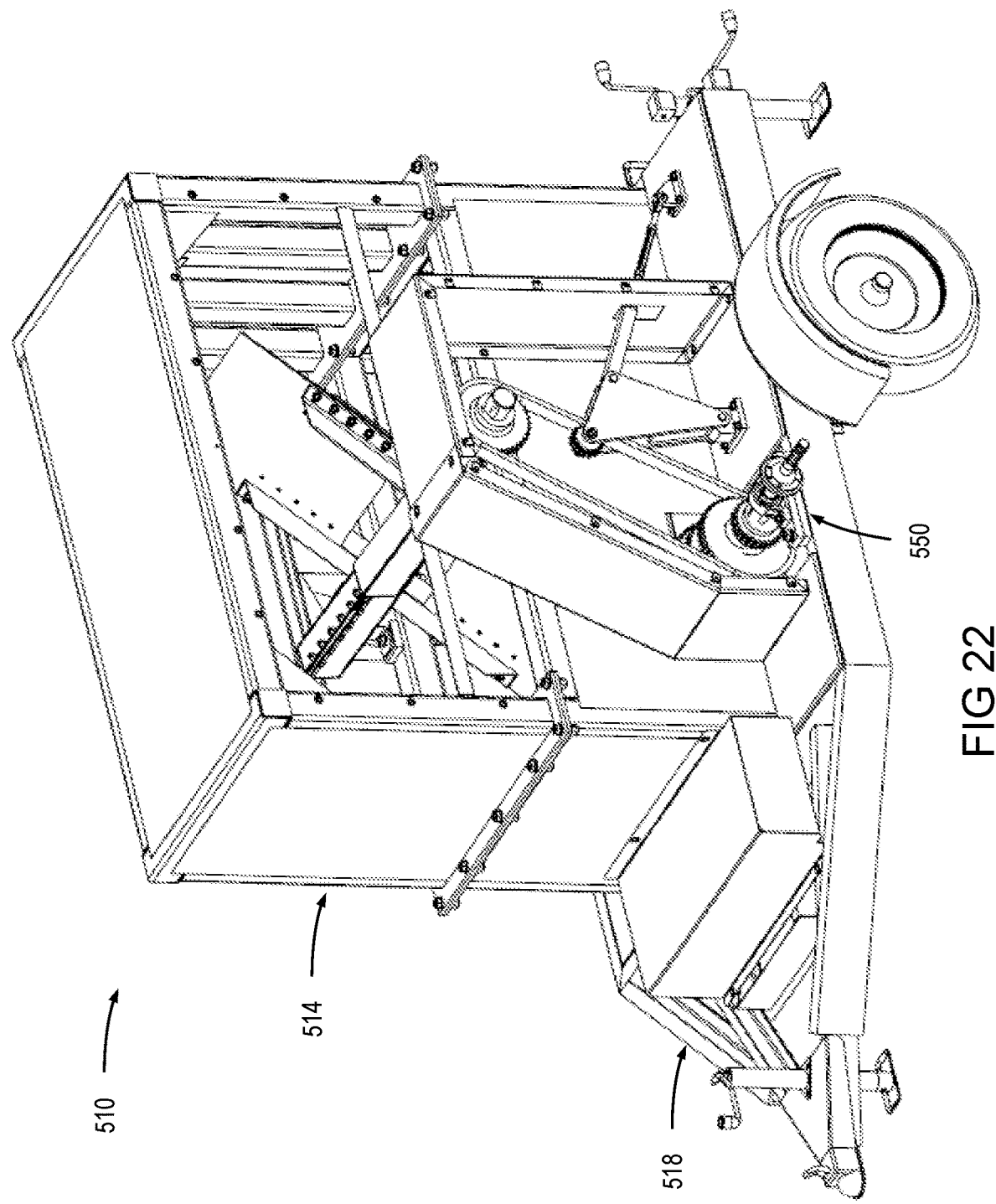
FIG. 22 is a perspective view of yet another fan apparatus according to the principles of the present disclosure.

With reference to FIG. 22, another fan apparatus 510 is provided. The fan apparatus 510 may include a fan assembly 514 and a base 518. The structure and function of the fan assembly 514 can be similar or identical to that of the fan assembly 14, 214, 414.

Like the fan assembly 14, the fan assembly 514 includes a drive assembly 550 (similar to the drive assembly 50) that may include a drive shaft (similar or identical to drive shaft 54), first, second and third drive wheels (e.g., sprockets, gears or pulleys)(similar or identical to drive wheels 58, 62, 66), a driven wheel (e.g., a sprocket, gear or pulley)(similar or identical to driven wheel 70), a torque-transmission loop (e.g., a chain or a belt; similar or identical to torque-transmission loop 74), and a tensioner assembly (similar to tensioner assembly 78).

In some configuration, the fan assembly 514 may include multiple drive shafts 554 (each may have its own set of first, second and third drive wheels mounted thereto). Only one of the multiple drive shafts 554 may be mounted on the fan assembly 514 at any given time. The other drive shaft(s) 554 may be stored in a suitable location while not in use (or while not mounted on the fan assembly 514). Each of the multiple drive shafts 554 may be configured for operation at a target rotational speed (or range of rotational speeds). For example, one of the drive shafts 554 may be configured for rotation at approximately 540 revolutions per minute, and another of the drive shafts 554 may be configured for rotation at approximately 1000 revolutions per minute.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fan apparatus comprising:
    a frame;
    a fan supported for rotation relative to the frame and including a fan shaft and a plurality of blades extending outward from the fan shaft; and
    a first assembly for driving the fan shaft, wherein the first assembly includes:
        a driven wheel mounted on the fan shaft;
        a drive shaft supported for rotation relative to the frame;
        a first drive wheel mounted on the drive shaft;
        a second drive wheel mounted on the drive shaft; and
        a first torque-transmission loop engaged with the driven wheel,
        wherein the first assembly is operable in a first mode in which the first torque-transmission loop is engaged with the driven wheel and the first drive wheel and a second mode in which the first torque-transmission loop is engaged with the driven wheel and the second drive wheel; and
    a second assembly for driving the fan shaft including:
        a belt pulley;
        a belt-pulley-shaft mounted for rotation relative to the frame;
        a first belt-pulley-wheel mounted on the belt-pulley-shaft;
        a second belt-pulley-wheel mounted on the belt-pulley-shaft;
        a belt-pulley-driven-wheel mounted on the fan shaft; and
        a second torque-transmission loop,
        wherein the second assembly is operable in a third mode in which the second torque-transmission loop is engaged with the belt-pulley-driven-wheel and the first belt-pulley-wheel and a fourth mode in which the second torque-transmission loop is engaged with the belt-pulley-driven-wheel and the second belt-pulley-wheel.

2. The fan apparatus of claim 1, further comprising a tensioner assembly configured to engage the first torque-transmission loop.

3. The fan apparatus of claim 2, wherein the tensioner assembly comprises:
    a loop-tightening lever mounted for rotation relative to the frame;
    a tightening wheel rotatably mounted to the loop-tightening lever; and
    an adjustment mechanism attached to the loop-tightening lever and movable to adjust a position of the loop-tightening lever relative to the frame.

4. The fan apparatus of claim 3, wherein the adjustment mechanism includes a turnbuckle.

5. The fan apparatus of claim 1, further comprising a base supporting the frame, the fan, and the drive mechanism, wherein the base includes a transport mechanism.

6. The fan apparatus of claim 5, wherein the transport mechanism includes a plurality of wheels that movably support the fan apparatus.

7. The fan apparatus of claim 6, wherein the base includes a jack stand.

8. The fan apparatus of claim 5, wherein the transport mechanism includes a plurality of skids that movably support the fan apparatus.

9. A method comprising:
    providing a fan apparatus including a fan shaft and a plurality of blades extending outward from the fan shaft, a driven wheel mounted on the fan shaft, a first drive wheel mounted on a drive shaft, a second drive wheel mounted on the drive shaft, and a first loop;
    coupling a tractor engine to the drive shaft;
    selecting a load for breaking in the tractor engine;
    based on the selected load, switching the fan apparatus between a first mode in which the first loop is engaged with the driven wheel and the first drive wheel and a second mode in which the first loop is engaged with the driven wheel and the second drive wheel; and
    breaking in the tractor engine by operating the tractor engine under the selected load to spin the fan shaft and blades.

* * * * *